(12) United States Patent
Wasseluk

(10) Patent No.: US 10,006,183 B2
(45) Date of Patent: Jun. 26, 2018

(54) METHOD AND APPARATUS FOR TREATMENT OF WATER-BORNE CONTAMINANTS

(71) Applicant: Walter J Wasseluk, Hawthorn Woods, IL (US)

(72) Inventor: Walter J Wasseluk, Hawthorn Woods, IL (US)

( * ) Notice: Subject to any disclaimer, the term of this patent is extended or adjusted under 35 U.S.C. 154(b) by 0 days. days.

(21) Appl. No.: 15/446,285

(22) Filed: Mar. 1, 2017

(65) Prior Publication Data

US 2017/0198452 A1 Jul. 13, 2017

Related U.S. Application Data

(62) Division of application No. 14/355,279, filed on Apr. 30, 2014, now Pat. No. 9,758,403.

(51) Int. Cl.
*C02F 3/08* (2006.01)
*B01F 3/04* (2006.01)
*E02B 15/00* (2006.01)

(52) U.S. Cl.
CPC .................................. *E02B 15/00* (2013.01)

(58) Field of Classification Search
CPC .. C02F 3/082; C02F 2209/00; C02F 2209/42; C02F 3/06; C02F 3/08; C02F 3/11; B01D 33/48; B01D 53/84; B01F 3/04269; E02B 15/00

USPC .... 210/619, 242.2, 217, 242.1, 744; 261/92, 261/120, 122.1
See application file for complete search history.

(56) References Cited

U.S. PATENT DOCUMENTS 6,299,775 B1 * 10/2001 Elston ....................... C02F 9/00
210/605

FOREIGN PATENT DOCUMENTS

WO WO-9322244 A1 * 11/1993 .............. C02F 3/082

* cited by examiner

*Primary Examiner* — Claire A Norris
(74) *Attorney, Agent, or Firm* — Charles F. Meroni, Jr.; Meroni & Meroni, P.C.

(57) ABSTRACT

A lightweight, bioplastic, mobile, floating oil spill mechanical/biological recovery system is dimensionally compact, and quick to assemble. The floating platform can be readily positioned within any waterborne oil/contaminant spill area. After assembly, this platform or apparatus can be directed by either a hand-held digital radio control transmitter or GPS directed mechanism. A lower, multi-roller slip-on belt is designed to be mounted over a circular base support aeration hub assembly with alternating/spaced slotted ring water drainage separators. The belt and aeration assemblies dip bioaugmentation product into the contaminant site thereby exposing microorganisms to both oxygen and target contaminant for treatment and metabolism. Various mechanisms for enhancing metabolic activity of the bioaugmentation product operate in tandem with the primary belt and aeration assemblies to promote effective contaminant metabolism and overall treatment regimes.

12 Claims, 21 Drawing Sheets

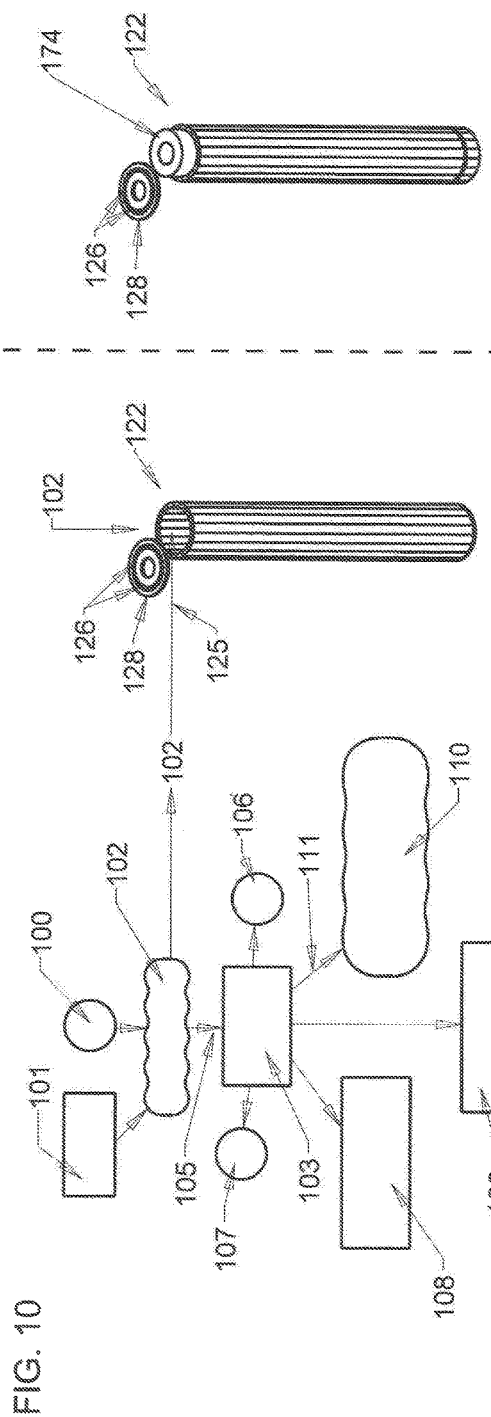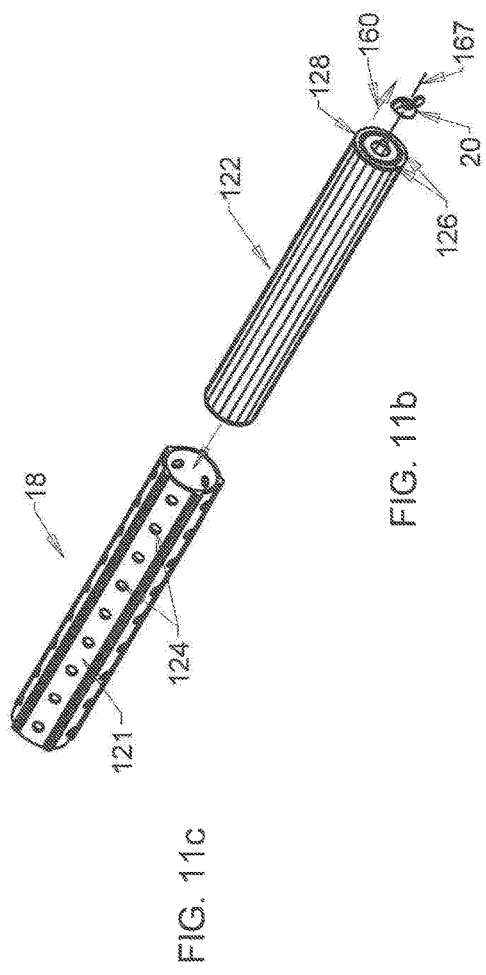

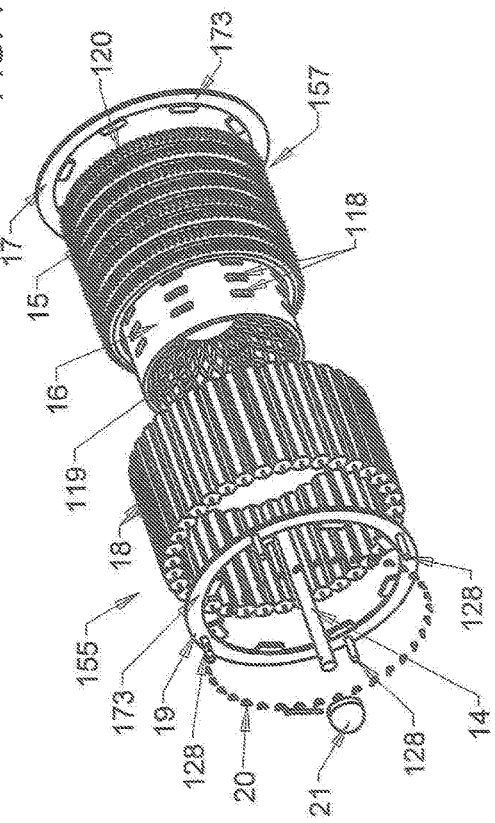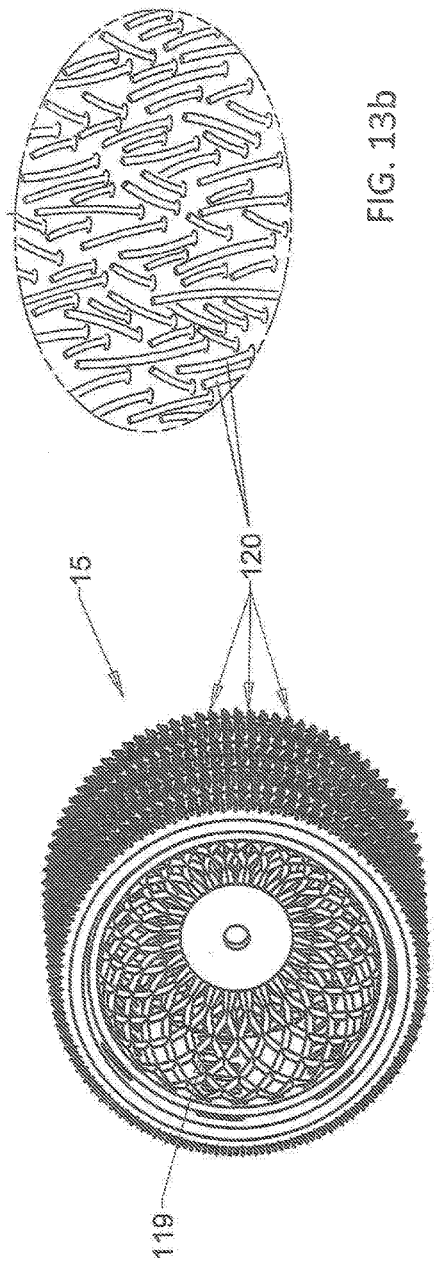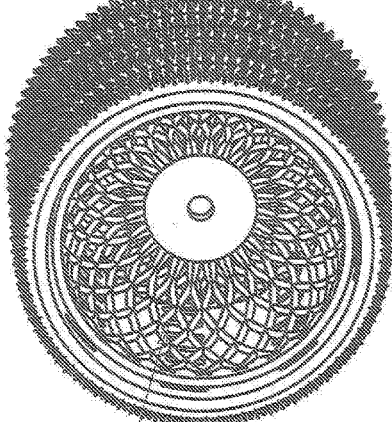

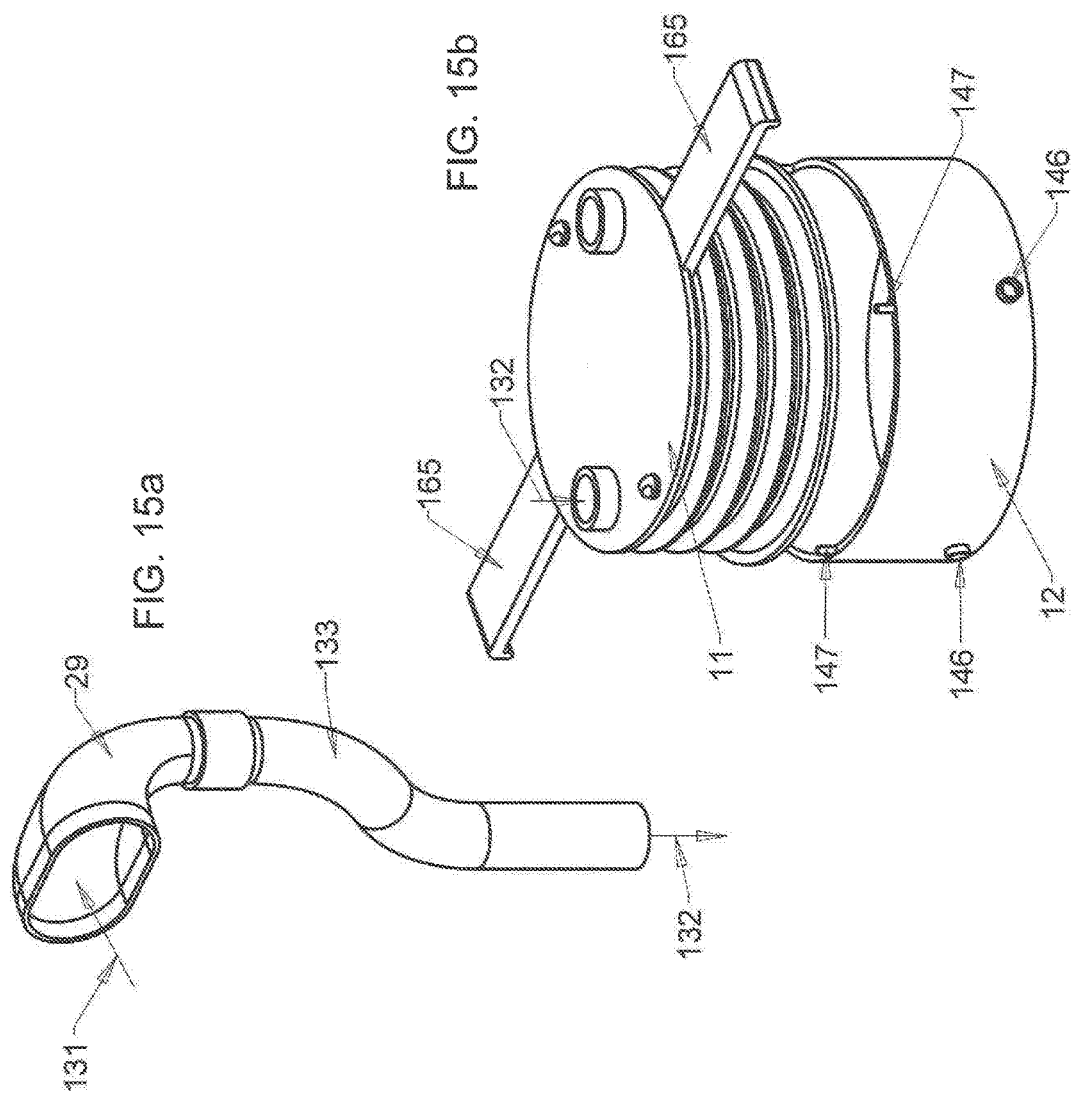

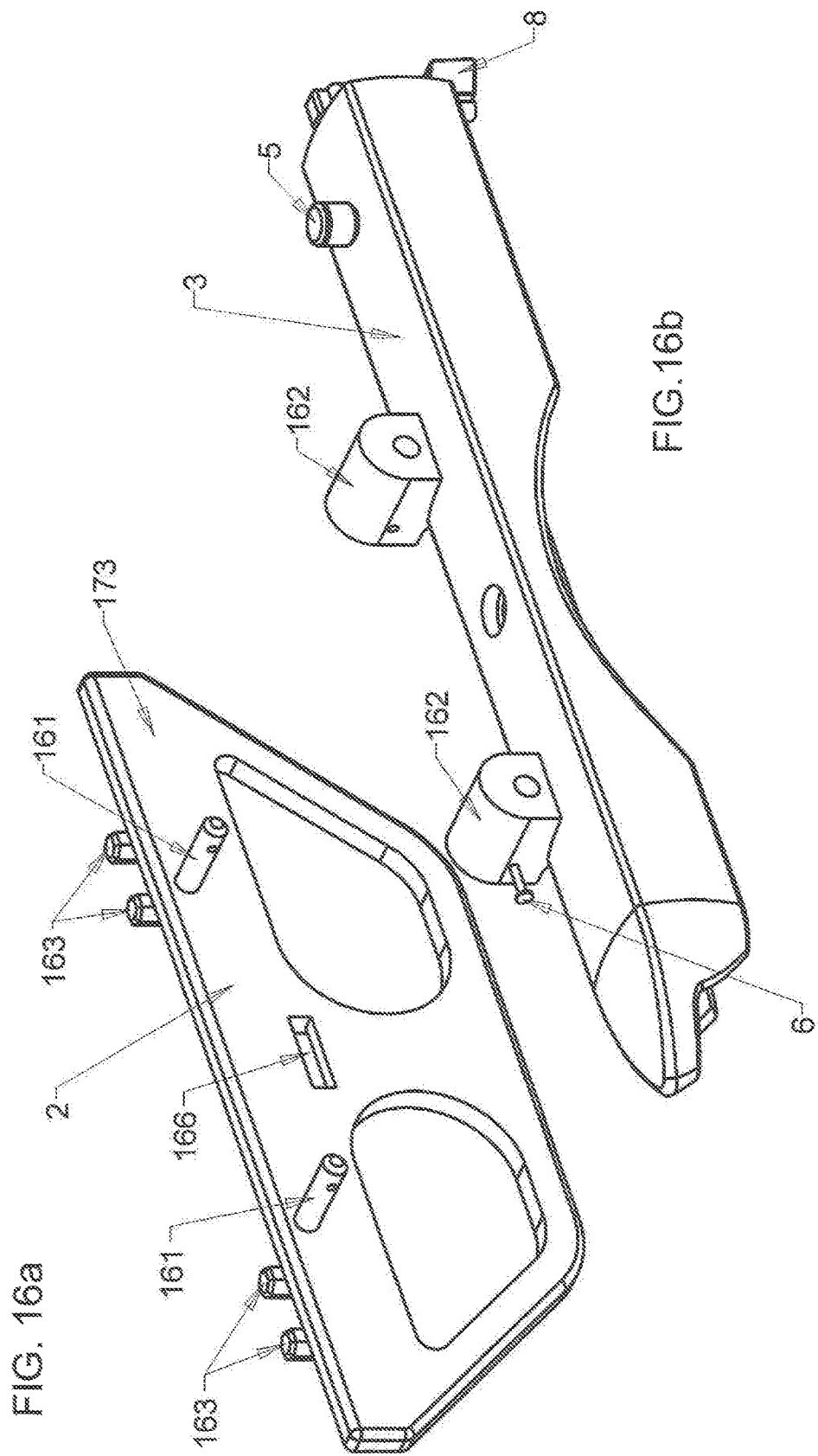

METHOD AND APPARATUS FOR TREATMENT OF WATER-BORNE CONTAMINANTS

PRIOR HISTORY

This application is a divisional of U.S. patent application Ser. No. 14/355,279, filed 30 Apr. 2014, the disclosure of which is incorporated by reference herein in its entirety.

This application, by way of its parent application, also claims the benefit of International Patent Application No. PCT/US2012/066592 filed in the United States Patent and Trademark Office (USPTO) as the International Receiving Office on 27 Nov. 2012, which International Patent Application claims the benefit of U.S. Provisional Patent Application No. 61/629,795, filed in the USPTO on 28 Nov. 2011.

BACKGROUND OF THE INVENTION

Field of the Invention

The present invention generally relates to a method and apparatus for cleaning water-borne contaminants. More particularly, the present invention relates to a method and apparatus for enhancing the conditions for bioactive treatment while simultaneously delivering bioactive media at a water-borne contaminant site for cleanup thereof via bioactive agents/media.

Discussion of the Prior Art

Oil spills are a problem that occasion developments in oil exploration, drilling, and transporting activities. The increasing frequency of oil spill events on waterways, including lakes, streams, rivers, and oceans has been responsible for devastating long-term effects to ecologically sensitive macro and micro ecological environments. In addition, dependency of worldwide demand upon petroleum based products, including refined oil, gasoline, and diesel products, is unlikely to diminish in the immediate future.

Many oil spill items/devices have been offered for oil capture and containment. Many require exceptional manpower requirements and training, often necessary access to utilities sources, heavy support equipment or restrictive area site preparation for dimensionally cumbersome or heavy process components. All systems must address the ultimate site preparation and disposal mandates of captured oil waste promulgated by state and federal regulatory agencies.

Accordingly, it is desirable to provide an oil spill recovery system that is environmentally friendly, simple to operate and effective in rapidly containing and disposing of oil spill operations mishaps of any magnitude while minimizing on-the-job training requirements, space, ultimate disposal and costly manpower/equipment operation and maintenance concerns let alone immediate surrounding ecological impact pressures.

SUMMARY OF THE INVENTION

The present invention provides a lightweight, all bioplastic mobile floating oil spill mechanical/biological recovery system. The described floating oil spill recovery and biological treatment system is a dimensionally compact, quick to assemble floating platform that could be readily positioned within any waterborne oil/contaminant spill area.

After assembly, this platform or apparatus can be directed by either a hand-held digital radio control transmitter from shore, floating vessel, and aircraft or coupled with a more sophisticated Unmanned Air Vehicle (e.g. an Aeryon's Scout) with a Global Positioning System (GPS) Latitude-Longitude signal transmitting/receiver package. The present invention was designed for either type of directional control.

The present invention incorporates a prewired architecture, base contactor "drop-in" equipment tray to hold such components. A pair of specialized stabilizer bioplastic veneer, buoyant foam, flow-directing floats, attached by way of "slip-on" DC power transmission contact/mounting pegs to the "wave suppressor" main bioplastic platform, has mounted stern servo/rudder arrangements with a pair of self-contained submerged belt turbine-cup style propulsion impeller belts to move the device to the spill site.

These specialized "flow directional" full length floats work in synchrony with a pair of bioplastic main platform girders which act as direction enhancing centerboards, aids in the first initial assembly step of the main platform table, adding terrain surface to the main platform clearance protection for the rotating Aeration Hub Assembly and "outfitter stabilizer" floats.

These bioplastic girders provide clearance when the platform is floating at operating water level from any underwater terrain obstructions plus act as supporting rails to slide over the shoreline into the water after land assembly.

A lower, multi-roller slip-on belt is designed to be mounted over a circular base support aeration hub assembly with alternating/spaced slotted ring water drainage separators. The "belt" is secured by a pair of separate "lipped" circular x pitched, perforated blade retainer liquid "aeration" hubs extruded of currently available bioplastic materials.

These hubs are held in place by a threaded spanner nut-locked hollow bioplastic material shaft which is slid through sleeve insert pillow bearing (two point) supports. This drive shaft is locked in place by an "indexed shear pin set" within a D.C. synchronous female "dual" drive coupling. This same arrangement is duplicated on tandem centerline of the "opposite end hub" configuration.

The aforementioned slide-on belt's individual rollers are held by center rods to a large composite pair of "set rings" (installed with flat roller stem ends facing inward toward the D.C. motor drive Coupling while the threaded locking wing nut end faces outward to "shroud cavity opening".

Ring "pegs" for the upper adjustable "pressure setting" recovered oil slotted x internal auger roller "assembly" are mounted on the lower roller attachment ring facing outward (@ 0, 90, 180, 270 degrees) toward the "shroud oil capture cavity". These peg actuators are positioned to actuate the upper internal auger to periodically move deposited captured oil towards the upper collector header for gravity flow to the round submerged collapsible storage tank.

The lower rollers consist of two (2) elements: (1) an outer pliable open-pore formed foam-like sleeve is affixed over a firmer durometer pliable perforated "support septum" (i.e. core), and (2) an inner "slit cut" pliable "holding tube for either, or both, granulate/liquid. Commercially available bacterial bioaugmentation product fits firmly within the pliable support septum of the outer roller. The inner flexible "slit cut" filler tube, when the adjustable pressure is applied by the upper roller, will "press-eject" hydrated, log growth phase bacteria through these tube sealing perforated end caps". These same end caps also align the securing roller center rods to the outer multi-roller slip-on belt mounting ring.

Among other objectives and features, the lower individual slip-on belt rollers: (1) activate bioaugmentation products for cycled "pressure ejection" on both roller ends for directed, concentrated area distribution of substrate specific bacteria within "oil spill plumes"; (2) provide a measure of insulation for water temperature variations; (3) provide a measure of incubation time within the slit tube retained bio-product; (4) provides surface adhesion for polar and non-polar oil spill dispersions; (5) provide for favorable biofilm development (thickness controlled by the upper roller pressure adjustment) for enhanced "biodegradation"; and (6) provide bulk water drainage and directs released water to the circular base support element separator rings for aeration "cascade flow" through the central drive hub slotted/pitched turbine aeration "saturator blades" (this action allows for optimum water temperature limiting saturation index oxygenation for bacterial 'log growth" support requirements); and (7) provide greater "biofilm development/surface area contact/adhesion exposure area" than a "flat belt" design.

PRIMARY PARTS LIST

1. Main platform
2. Girder
3. Float, left
4. Float, right
5. DC motor, impeller drive
6. Lock pin, float
7. Impeller
8. Rudder
9. Generator, water-based
10. Generator, air-based, on float
11. Tank, aerobic, with straps
12. Tank, anoxic
13. Motor, turbine
14. Motor shaft, turbine
15. Bristle ring bands
16. Aeration hub assembly
17. Lower roller ring, inner
18. Lower rollers
19. Lower roller ring, outer
20. Wing nut for internal roller support rods
21. Hub, motor shaft
22. Upper roller housing with integral mini-fore/aft distributor rollers
23. Upper roller
24. Auger
25. Auger activator
26. Tension control handle
27. Shroud
28. Solar panel
29. Nozzle/drain tube
30. Battery tray
31. Battery
32. GPS
33. Fuel Cell
34. Generator, air-based on battery tray
170. Combination Battery Strength/USCG Red/Green Marker Strobe lights

BRIEF DESCRIPTION OF THE DRAWINGS

Other features of my invention will become more evident from a consideration of the following brief descriptions of illustrations of the subject invention:

FIG. 10 is a schematic of the basic metabolic process harnessed and enhanced by the apparatus and method according to the present invention.

FIG. 11(a)(1) is an end perspective view of a radially inner cylinder construction with end cap open for receiving and housing the bioaugmentation product or microorganism culture according to the present invention.

FIG. 11(a)(2) is an end perspective view of a radially inner cylinder construction with end cap open with an optional foam insert construction for receiving and housing liquid bioaugmentation product or microorganism culture according to the present invention.

FIG. 11(b) is a top perspective view of the radially inner cylinder construction with end cap closed thereby housing the bioaugmentation product or microorganism culture according to the present invention.

FIG. 11(c) is a top perspective view of the roller cylinder assembly with radially outer cylinder construction encasing the radially inner cylinder construction housing the bioaugmentation product or microorganism culture according to the present invention.

FIG. 13 is a top exploded perspective view of a cylinder assembly array and aeration hub assembly combination according to the present invention.

FIG. 13(a) is an anterior perspective view of an aeration hub assembly according to the present invention outfitted with bristled ring bands positioned in radially outer adjacency to drainage slots formed in the radially outer portion of the aeration hub assembly.

FIG. 13(b) is a fragmentary enlarged depiction of varied length bristles as sectioned from the bristled ring bands otherwise depicted in FIG. 13(a).

FIG. 15(a) is a second top perspective view of a nozzle drain tube header according to the present invention.

FIG. 15(b) is a top perspective view of a tank assembly comprising an upper bellows type tank and a lower or outer doughnut shaped tank assembly according to the present invention.

FIG. 16(a) is a top perspective view of the left girder element according to the present invention.

FIG. 16(b) is a top perspective view of the left float assembly according to the present invention.

FIG. 19(a) is a fragmentary exploded depiction of a portion of the platform, exploded to show otherwise hidden power delivery conductors.

DETAILED DESCRIPTION OF THE PREFERRED EMBODIMENT/METHODOLOGY

Figure 1:
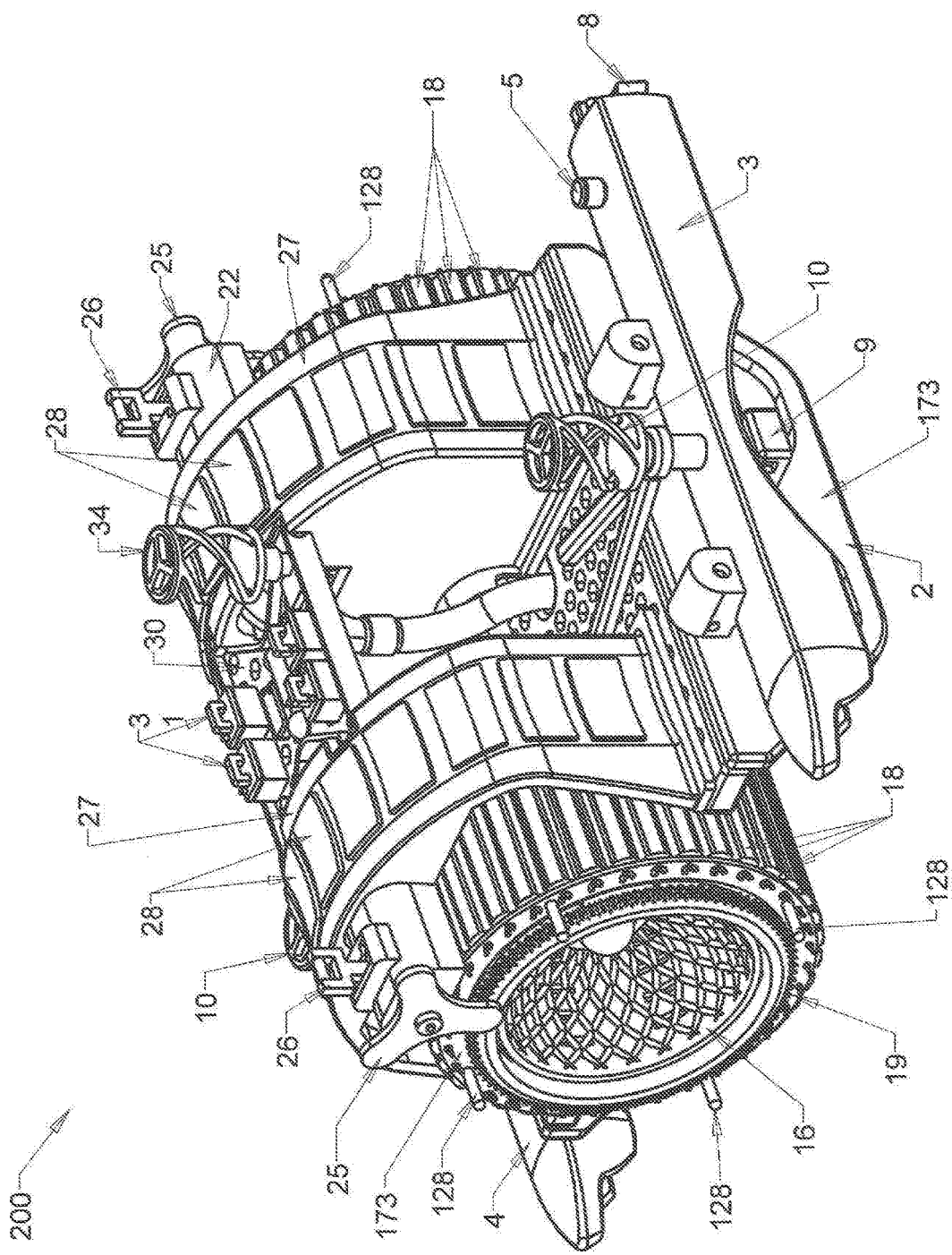
FIG. 1 is a left top perspective view of the apparatus for treating water-borne contaminants according to the present invention.
Figure 2:
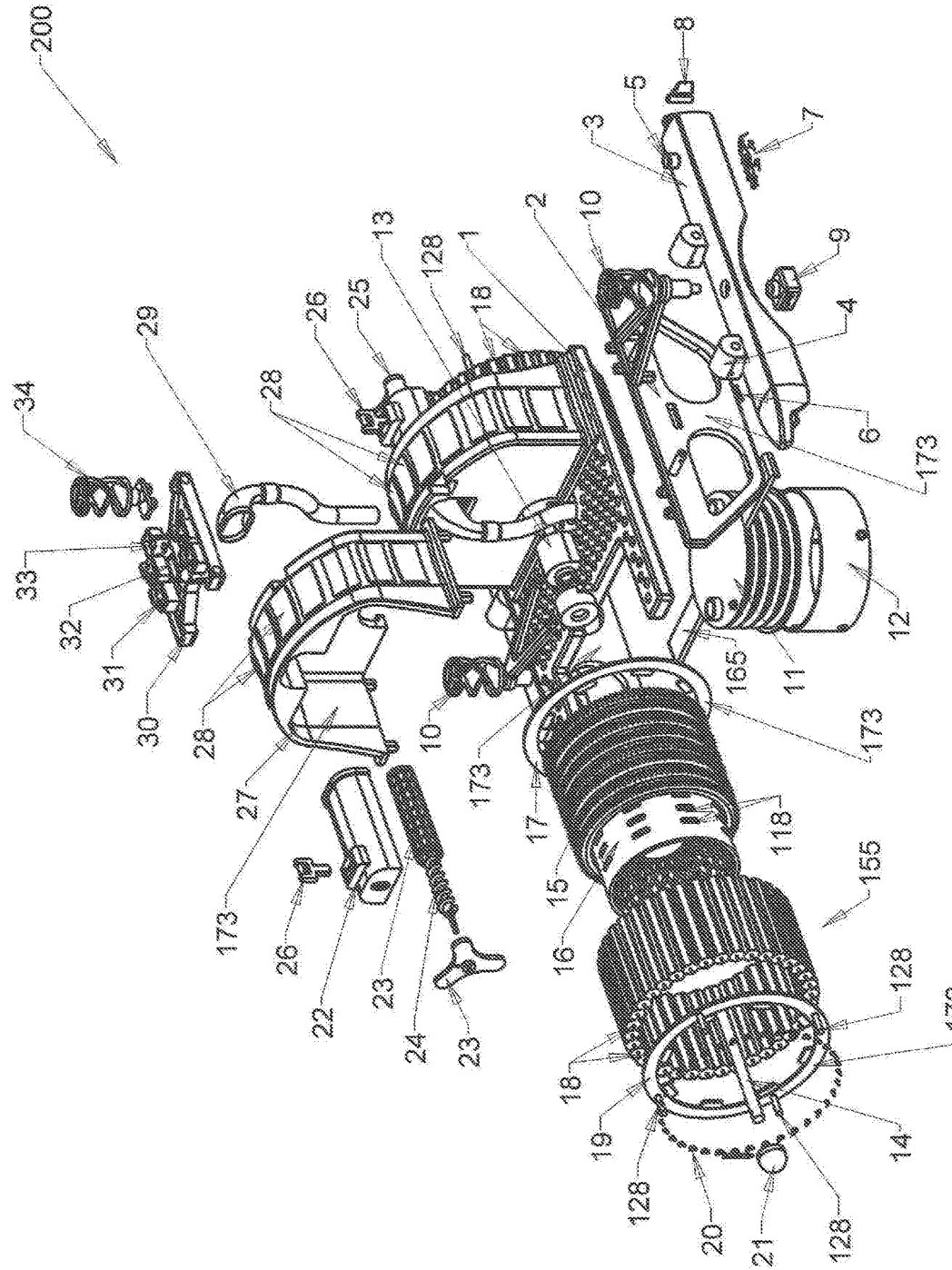
FIG. 2 is a left top exploded perspective view of the apparatus for treating water-borne contaminants according to the present invention.
Figure 3:
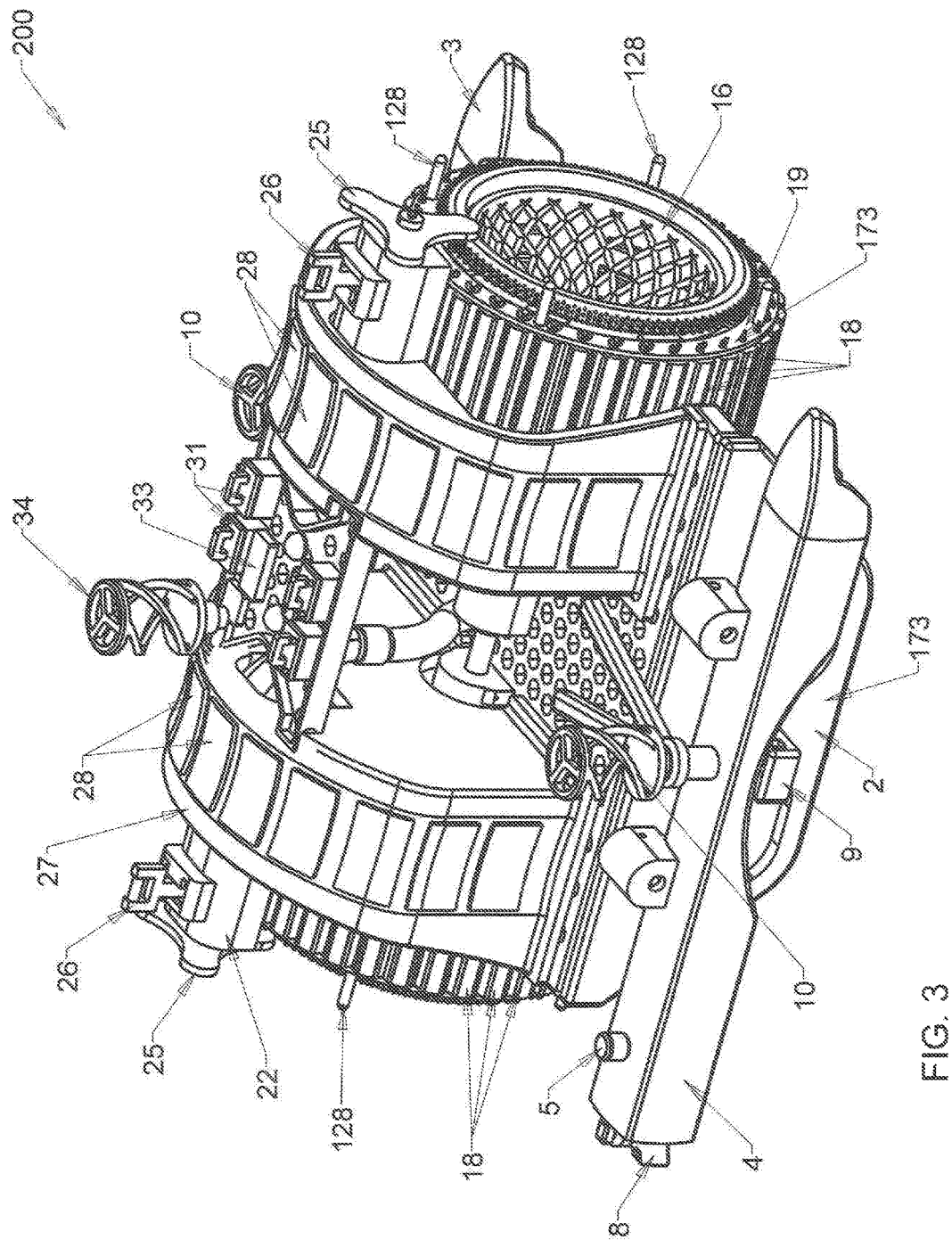
FIG. 3 is a right top perspective view of the apparatus for treating water-borne contaminants according to the present invention.

Referencing the drawings with more specificity, the reader will see that the contaminant treatment system or apparatus 200 according to the present invention attempts to harness and enhance the naturally-occurring metabolic activities of biologically active microorganisms as generically referenced at 102 to intake a contaminant substrate 101 (e.g. oil spill materials or similar other contaminants); biologically or metabolically process the contaminant substrate 101; and output various less harmful or innocuous by-products as at 103.

After assembly, this platform or apparatus 200 can be directed to a contamination site by either a hand-held digital radio control transmitter from shore, floating vessel, or aircraft or coupled with a more sophisticated Unmanned Air Vehicle (e.g. an Aeryon's Scout) with a Global Positioning System (GPS) Latitude-Longitude signal transmitting/receiver package. A generic GPS platform based module is depicted and referenced at 32. The present invention was designed for either type of directional control.

Oxygen as diagrammatically depicted and referenced at 100 is essential to the biological processes harnessed and enhanced by the present invention. The other essential component is the targeted contaminant or substrate essentially viewed as food by the microorganism(s) or bioaugmentation product 102. Referencing FIG. 10, the reader will see a diagrammatic depiction of the basic metabolic process whereby aerobic bacteria or microorganisms 102 in the presence of organics or contaminants 101 and (dissolved) oxygen 100 will immediately start to decompose the organics or contaminants 101.

The decomposition process is essentially a metabolic process 105 whereby $CO_2$ (106); $H_2O$ (107); energy 108; and stabilized, innocuous, solid organic residues (109) are produced as by-products 103. The solid organic residues 109 easily settle out of the liquid-based mixture and new microorganisms 110 are formed 111 whereafter the process can be repeated and accelerated in a log exponential growth pattern given ideal environmental conditions in which the microorganisms 102 and 110 can thrive.

There is only one basic need for aeration or oxygenation in any biological wastewater treatment system. That need is to supply oxygen 100 for respiration of microorganisms 102. Respiration is part of the total cellular process of utilization of organic substrates and creation of energy known as metabolism. In this aerobic metabolic pathway, organics are broken down into $CO_2$ and $H_2$ ions. The hydrogen is passed along a respiratory chain where it creates high energy packets of phosphates. At the end of the chain it combines with oxygen to form water.

The process of transporting the oxygen and its combination with hydrogen is known as respiration. In a dynamic system, change is constantly occurring in (1) the amount of substrate or food (i.e. the oil spill material or similar other contaminant); (2) the number of viable microorganism; (3) the amount of energy created; (4) the amount of oxygen utilized; and (5) the amount of $CO_2$ produced.

Bacteria are simple, colorless, one-celled microorganisms that use soluble food and are capable of self-reproduction without sunlight. Bacteria range in size from approximately 0.5 to 5 microns and, therefore, are only visible through a microscope or similar other instrument. Bacterial reproduction is by binary fission, that is, a cell divides into two new cells every 15-30 minutes in ideal conditions.

These aerobes require free dissolved oxygen in decomposing organic matter to gain energy for growth and multiplication. Commercially available liquid/granular bioaugmentation products that would be incorporated into the roller cylinders 18 could conceivably contain a variety of bacterial genera, including *Alcaligenes, Flavobacterium, Bacillus*, and *Pseudomonas*. Additionally, pH buffers and inorganic nutrients are generally included in many supplier formulations to end-user specifications.

Notably, during the metabolic process 105, particularly in a heavily contaminated environment, oxygen levels 100 can be quickly depleted. Accordingly, the apparatus 200 according to the present invention makes central to its design the creation of an oxygenated environment at the contamination site so that the microorganisms 102/110 can thrive in more ideal environment and thus more aggressively metabolize 105 the contaminant field 101. Other secondary functions of the apparatus 200, however, include providing an attachment surface for additional biodegrading films, similar to those found on current best available treatment wastewater tricking filters and rotating biological contactors.

Figure 4:
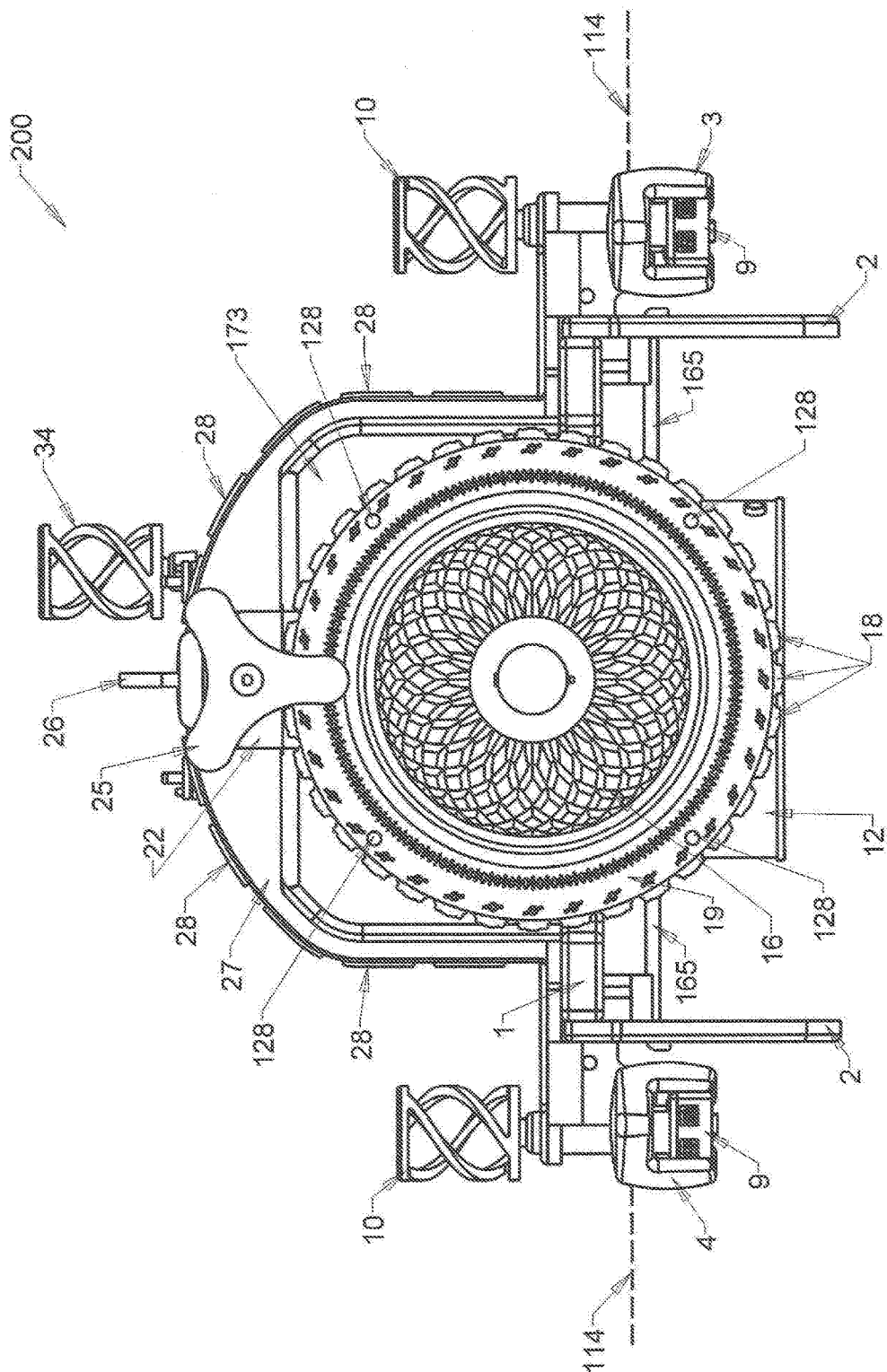
FIG. 4 is a front elevational view of the apparatus for treating water-borne contaminants according to the present invention.
Figure 5:
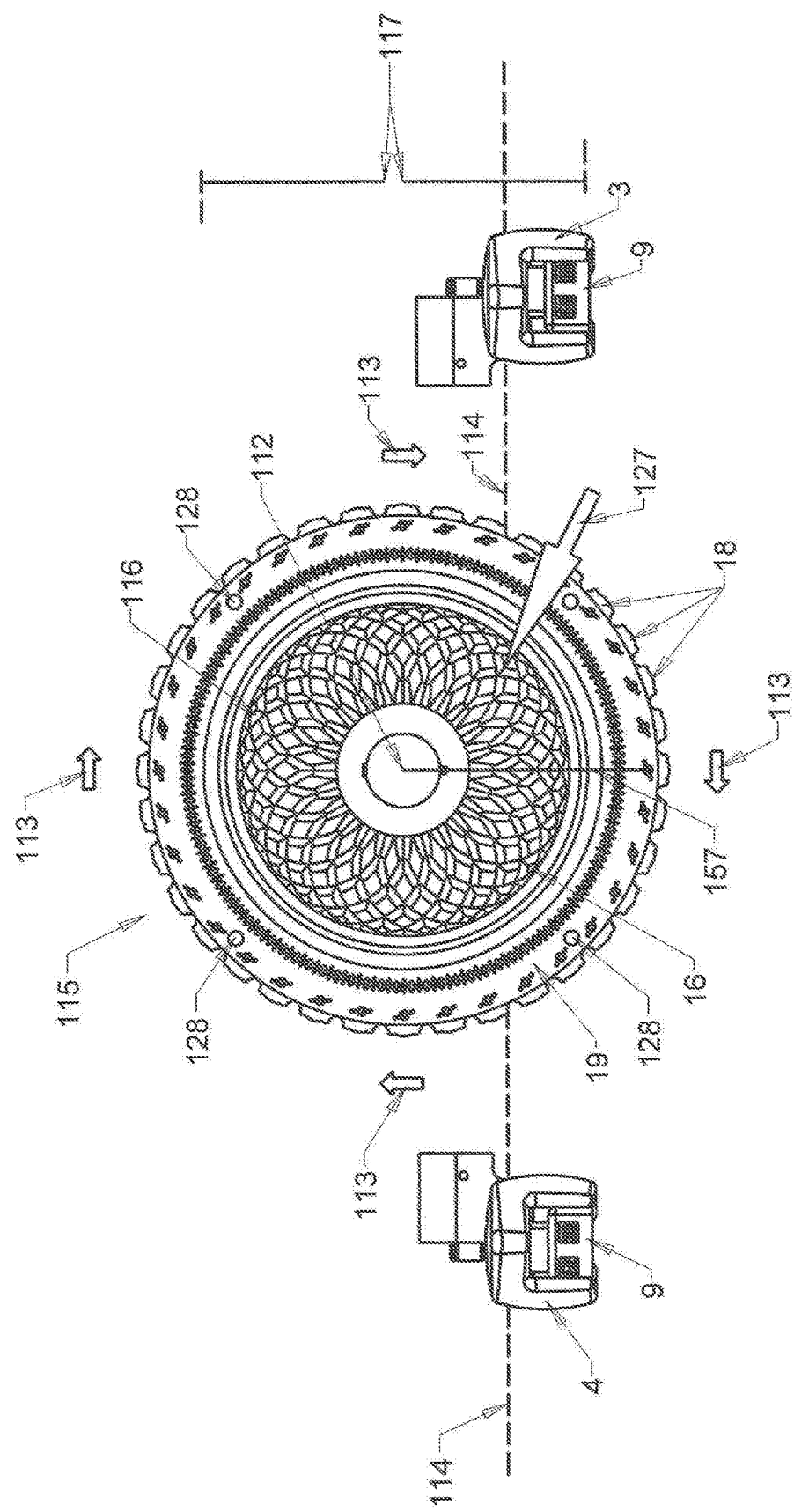
FIG. 5 is a fragmentary frontal elevational view of certain portions of the apparatus for treating water-borne contaminants with parts being removed to more clearly show the water/contaminant surface line relative to floats and an aeration hub assembly according to the present invention.
Figure 6:
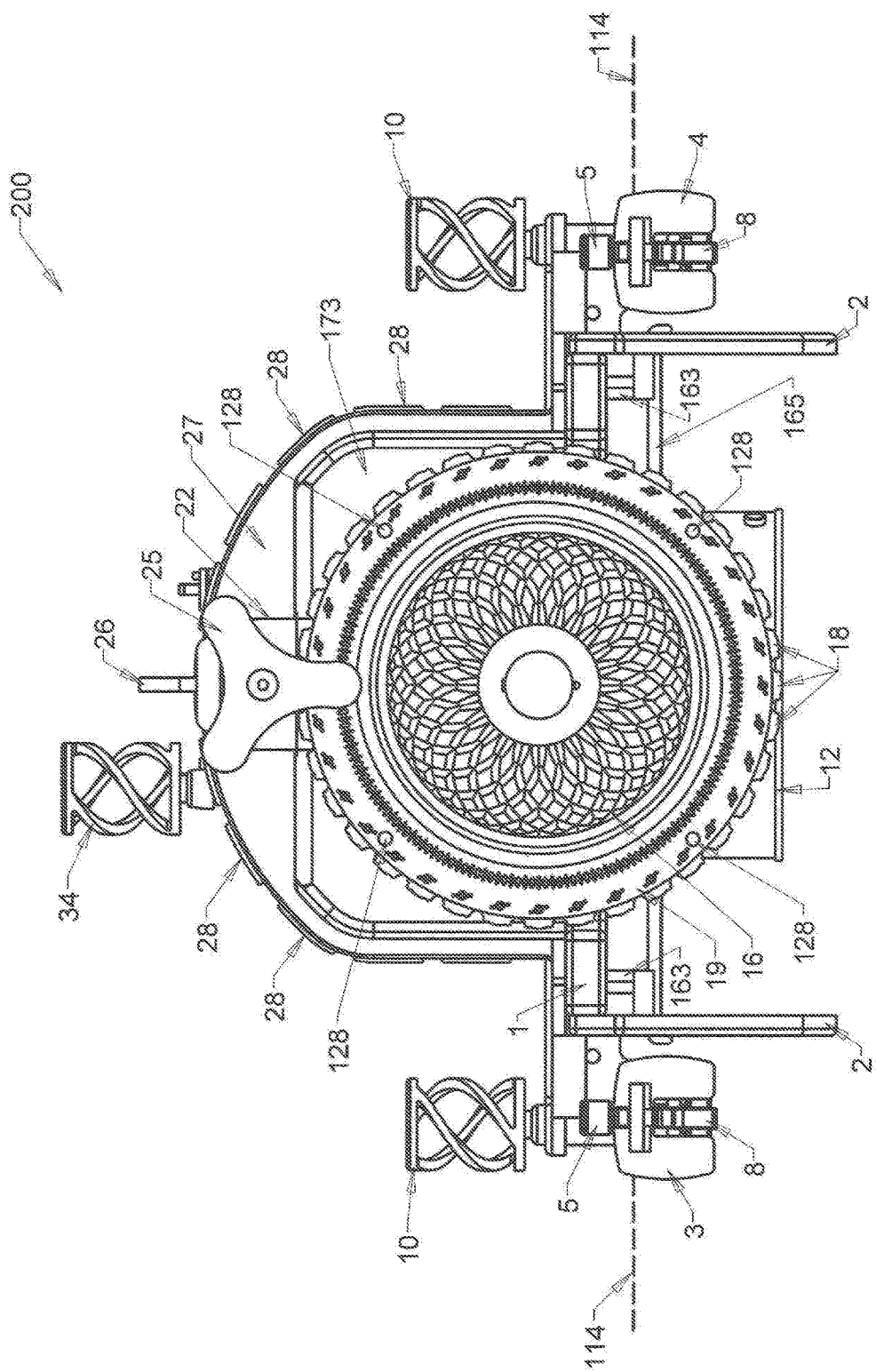
FIG. 6 is a rear elevational view of the apparatus for treating water-borne contaminants according to the present invention.

To achieve these primary objectives, the system or apparatus 200 according to the present invention preferably includes or comprises a pair of in-line or coaxial aeration hub assemblies as generally depicted and referenced at 16. The aeration hub assemblies are located at opposed ends of the apparatus 200 as comparatively depicted in FIGS. 4 and 6. Each aeration hub assembly 16 is preferably formed of or constructed from bioplastic material(s), and has a circular transverse cross-section, and an axis of rotation 112 about which the aeration hub assemblies 16 rotate (as diagrammatically depicted at vectors 113), preferably in a clockwise manner for enabling worm gear type progression of certain bioactive materials as discussed in more detail later in the specifications that follow.

Figure 19:
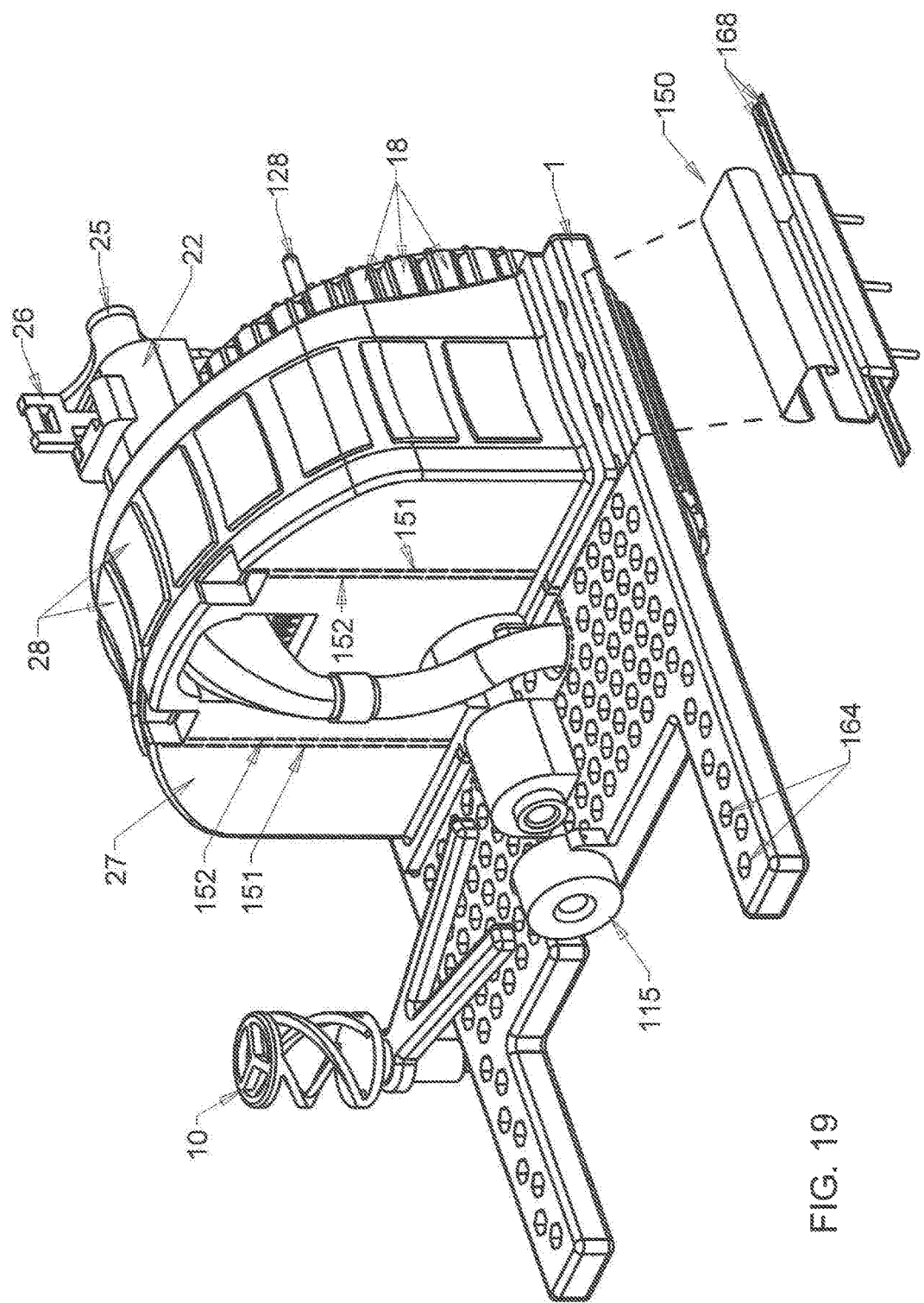
FIG. 19 is a top perspective view of the apparatus according to the present invention with parts removed to highlight certain otherwise hidden structures and power delivery pathways.
Figure 20:
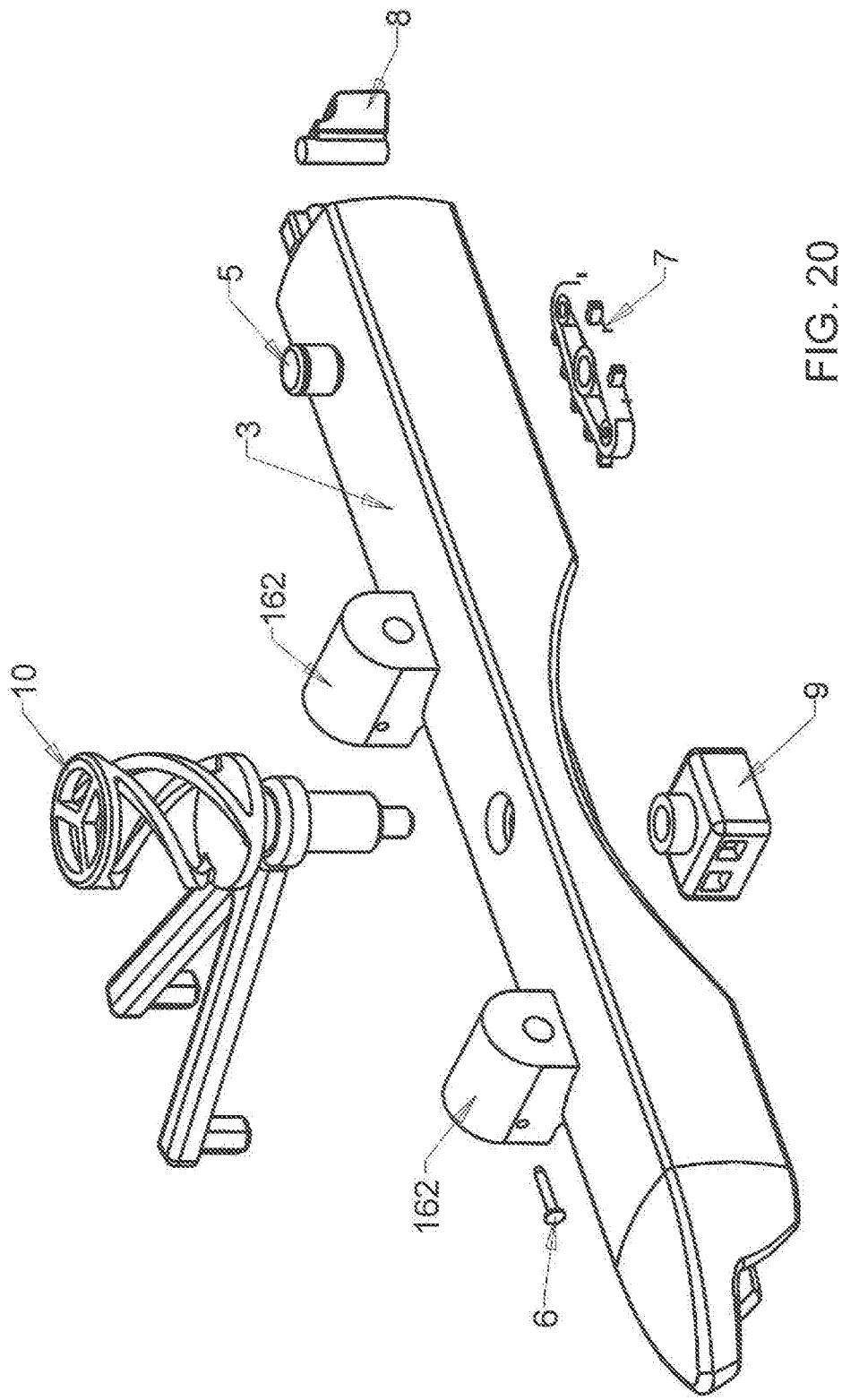
FIG. 20 is a top exploded perspective view of a float assembly according to the present invention with various add-on sub-assemblies associated therewith.
Figure 21:
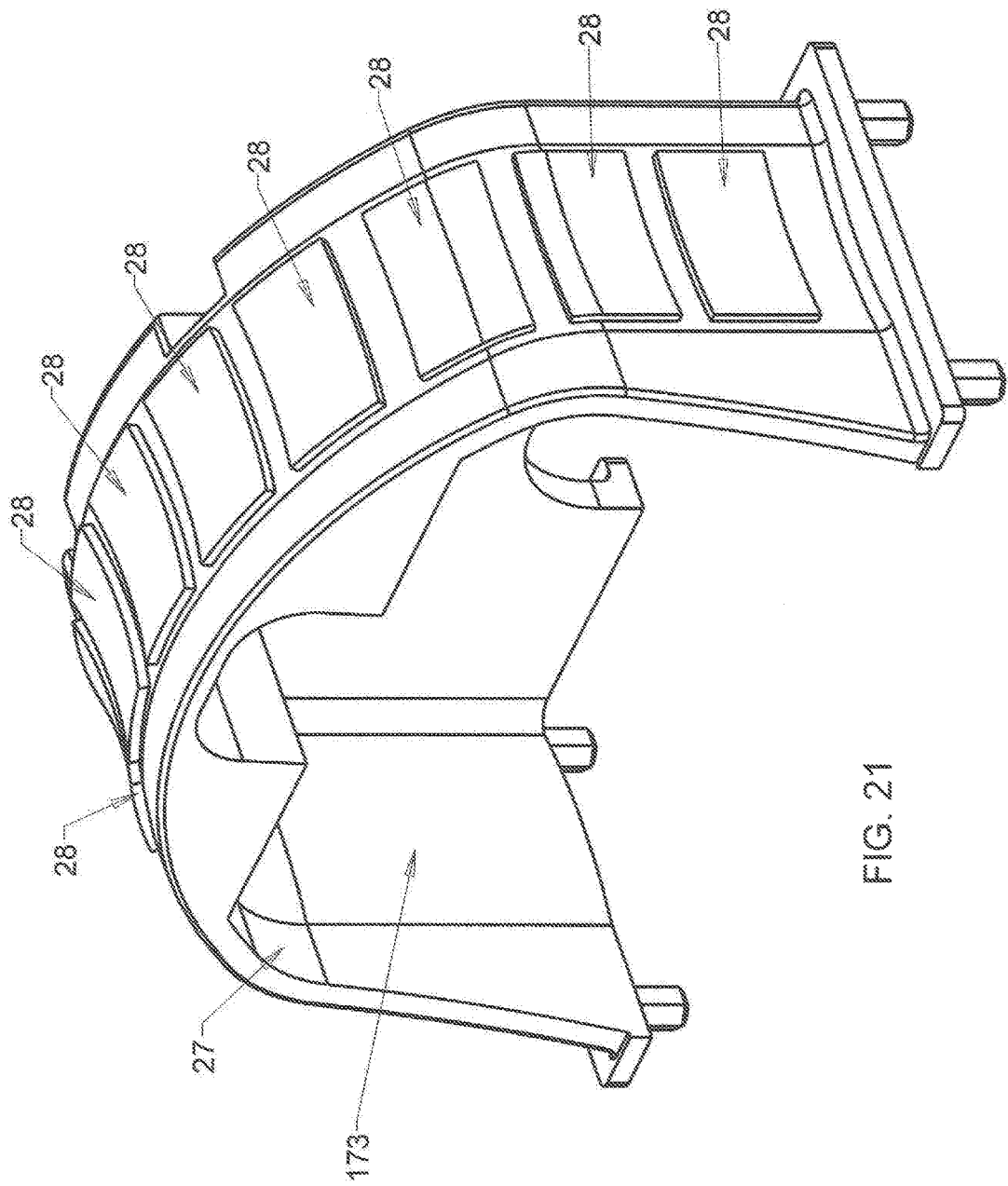
FIG. 21 is a top frontal perspective view of a solar cell shroud construction according to the present invention showing a series of solar cell modules arranged along the outer arc length of the shroud.

The axis of rotation 112 is preferably positioned in parallel superior adjacency to the water or spill surface as at 114. To achieve the rotational motion, a bioplastic platform 1 according to the present invention has attached thereto a motor as at 13 as perhaps best seen in FIG. 19. The motor 13 may preferably be exemplified by a secured, dual coupling, ⅓ HP, variable speed DC environmentally protected, synchronous motor. This motor 13 is attached to a pair of hollow bioplastic, female coupling, spline-locked shafts 14, the axes of which define the axis of rotation 112. The coaxial shafts 14 extend through oversized, zerk-fitted, vegetable grease-lubricated pillow bearings 115 for optimal low maintenance overhung load shaft support. The motor 13 enables rotation as at vectors 113 about the axis of rotation 112.

Each of the aeration hub assemblies 16 is outfitted with a diamond basket weave construction as at 116, which constructions 116 are partially immersed below the water or spill surface 114 roughly one quarter of the overall hub diameter(s) 117. The primary intended purpose of the aeration hub assemblies 16 is to enhance and maintain the dissolved oxygen growth requirements of commercially available, substrate specific, aerobic genera of liquid or granular bioaugmentation formulations used for the specific waste stream type to be treated. An added benefit of the aeration hub assemblies 16 is to maximize temperature(s) for the oxygen solubility index of the surrounding spill water area.

The basket weave construction 116 essentially operates to churn the water or spill materials at or adjacent the surface line 114 (not specifically illustrated) so that proper oxygen growth requirements are met. Positioned over the aeration hub assemblies 16 are bio-film/water drainage ring bands as depicted and referenced at 15. The ring bands 15 are elastomeric and are elastically deformed and stretched to circum fit over or around the hub assemblies 16. In other words, the ring bands 15 are positioned over the full diameter and width of the aforementioned rotating pair of diamond basket weave aeration hub assemblies 16. The ring bands 15 are positioned so as to cover drainage slots 118 formed in the radially outer portion 119 of the aeration hub assemblies 16. These ring bands 15 are secured in position by way of end rings, including an inner end ring 17 and an outer end ring 19.

The ring bands 15 are preferably outfitted with varied length, surface area enhancing polyethylene bristles 120. The ring bands 15, outfitted with varied length, surface area enhancing polyethylene bristles 120, uniformly direct contaminant spill or oil spill drainage water into a thin film descending cascade over the concave aeration hub assemblies 16 (through the slots 118) and lower roller cylinder assemblies 18 to return the cascading material to the oil spill water area for desired area turbulence and eventual biological product contact of the surrounding, induced, vortexed water/contaminant mixture opposite the pair of rotating aeration hub assemblies 16, and roller cylinder assemblies 18. This wastewater treatment regime allows for the gradual development of suspended-attached biological film (or "schmutzdecke") having roughly $3.12 \times 10^{-2}$ inch thickness to form an added measure of biological "contact degradation" of the descending oil/contaminant film wastewater.

As prefaced above, installed and located in radial outer adjacency to the aeration hub assemblies 16 and ring bands 15 are roller cylinder assemblies 18 according to the present invention. Each of the roller cylinder assemblies 18 comprise a radially outer or external open pore (as at 124) foam casing, sheath, or envelope as at 121; a radially internal slit cut, 60 durometer, flexible, dual-ejector end-capped, flexible tube as at 122; and centralized, full length bioplastic alignment rods, the outside threaded stem ends of which are referenced at 123.

Threadably attachable to the stem ends 123 are bioplastic wing nuts 20, which wing nuts 20 secure bioplastic full circle attachment end ring as at 17 and 19 to the roller cylinder assemblies 18. The commercially available bioaugmentation granular/liquid product 102 are poured as at 125 into the radially inner cylinder construction 122 as generally depicted and referenced in FIG. 11(a). Pores 126 at the end of the tube 122 enable bioactive product to escape (as at 160) the tube 122 and enable moisture and contaminant to enter the tube 122. The internal flexible cylinders 122 hold the commercially available bioaugmentation granular/liquid product 102 for the required moisture activation. A foam insert 174 may be inserted into tube 122 for liquid product.

The roller cylinder assemblies 18 preferably rotate in a clockwise manner as at vectors 113 inducing a surface water oil/contaminant spill film vortex current to spiral towards (as at 127) the aforementioned aeration hub assemblies 16 to facilitate the mechanical surface contact adsorption of the polar/nonpolar oil/contaminant by the clockwise rotating 113 open-pore 124/126 dipping pick-up action of the roller cylinder assemblies 18.

The radially outer or external open pore foam casing, sheath, or envelope as at 121 of the roller cylinder assemblies 18 also provides a measure of internal incubator temperature control for their internal flexible bioproduct-contained slit tubes 122. The moisture activated, commercially available, granular/liquid bioaugmentation product's necessary initial log-growth is enhanced and maintained by the outer or external open-pore foam insulative barrier provided by the casing 121. The developed log growth stage bacterial cells are then pressure ejected through solid, perforated 126 end caps 128 at both ends of the internal slit-cut cylinders 122 to both the spill area and external surface of the rotating open cell dipping foam cylinder casings 121.

The aforementioned clockwise-rotating aeration hub assemblies 16 and surface water spill oil/contaminant-dipping, open-foam roller cylinder assemblies 18 eject certain volumes of bioactive material. The ejection volumes are preferably manually controlled by a pair of 2-position handles 26 located on upper pressure roller housing 22 which houses or cooperates with an upper roller 23; an auger element 24; an auger activator or actuator 25; and the tension control handle 26. Besides supplying adjustable pressure to the lower rotating roller cylinder assemblies 18 for bioproduct ejection, adsorbed open pore foam agglomerated oil/contaminant is press-skimmed by the hard bioplastic, slotted roller 23.

Figure 7:
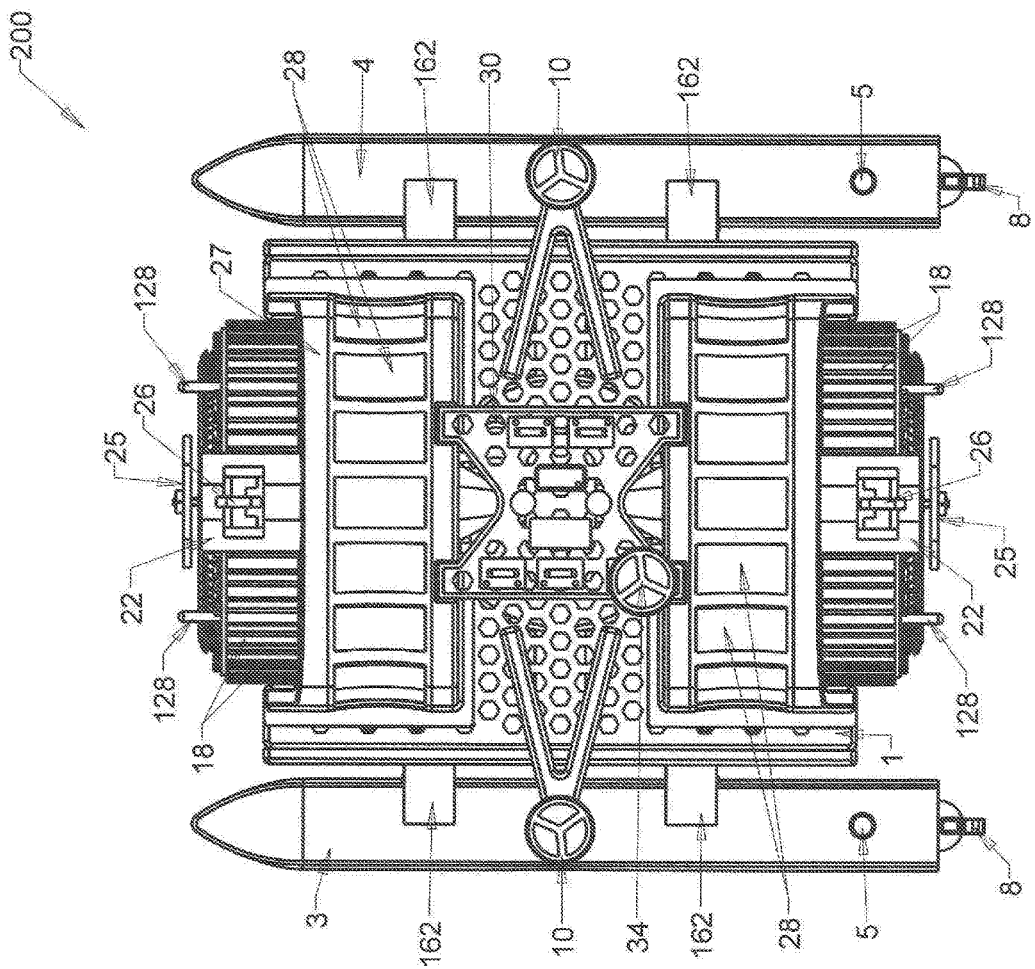
FIG. 7 is a top plan view of the apparatus for treating water-borne contaminants according to the present invention.
Figure 8:
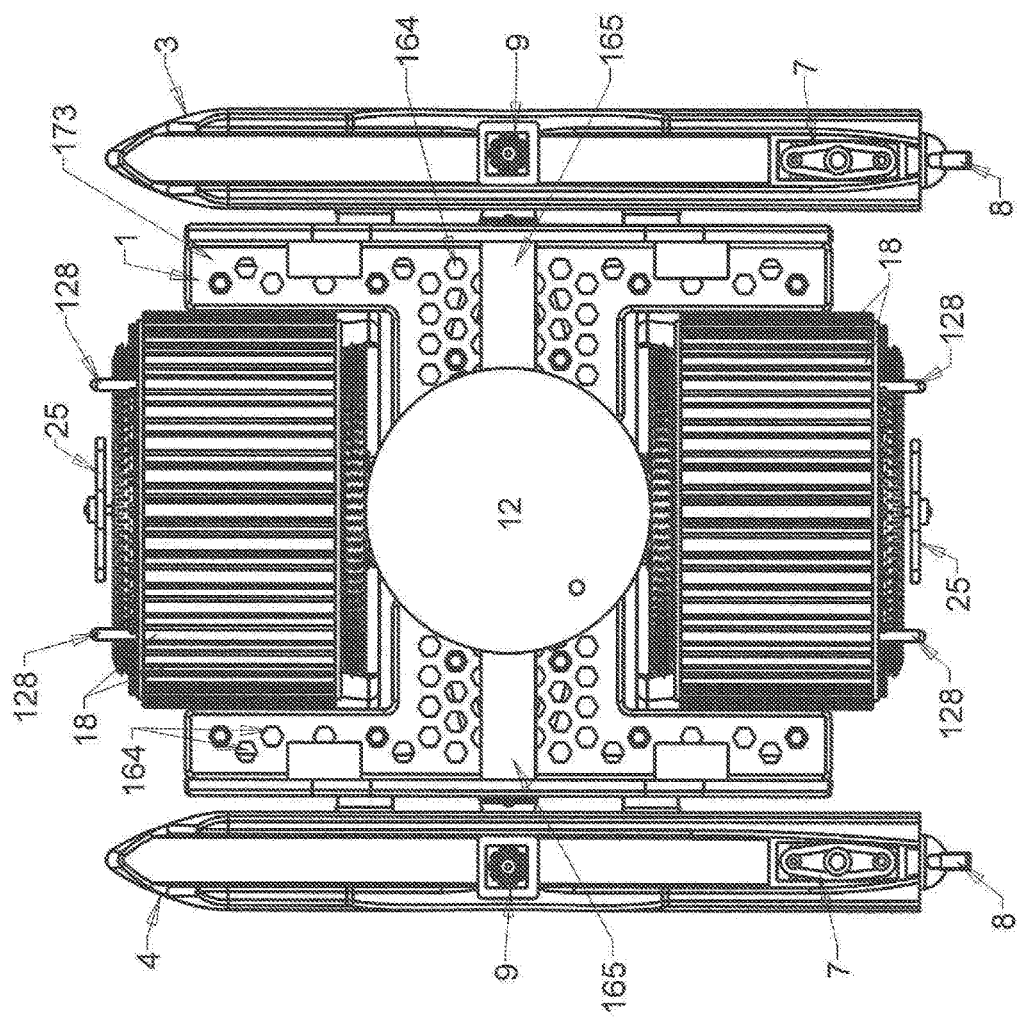
FIG. 8 is a bottom plan view of the apparatus for treating water-borne contaminants according to the present invention.
Figure 9:
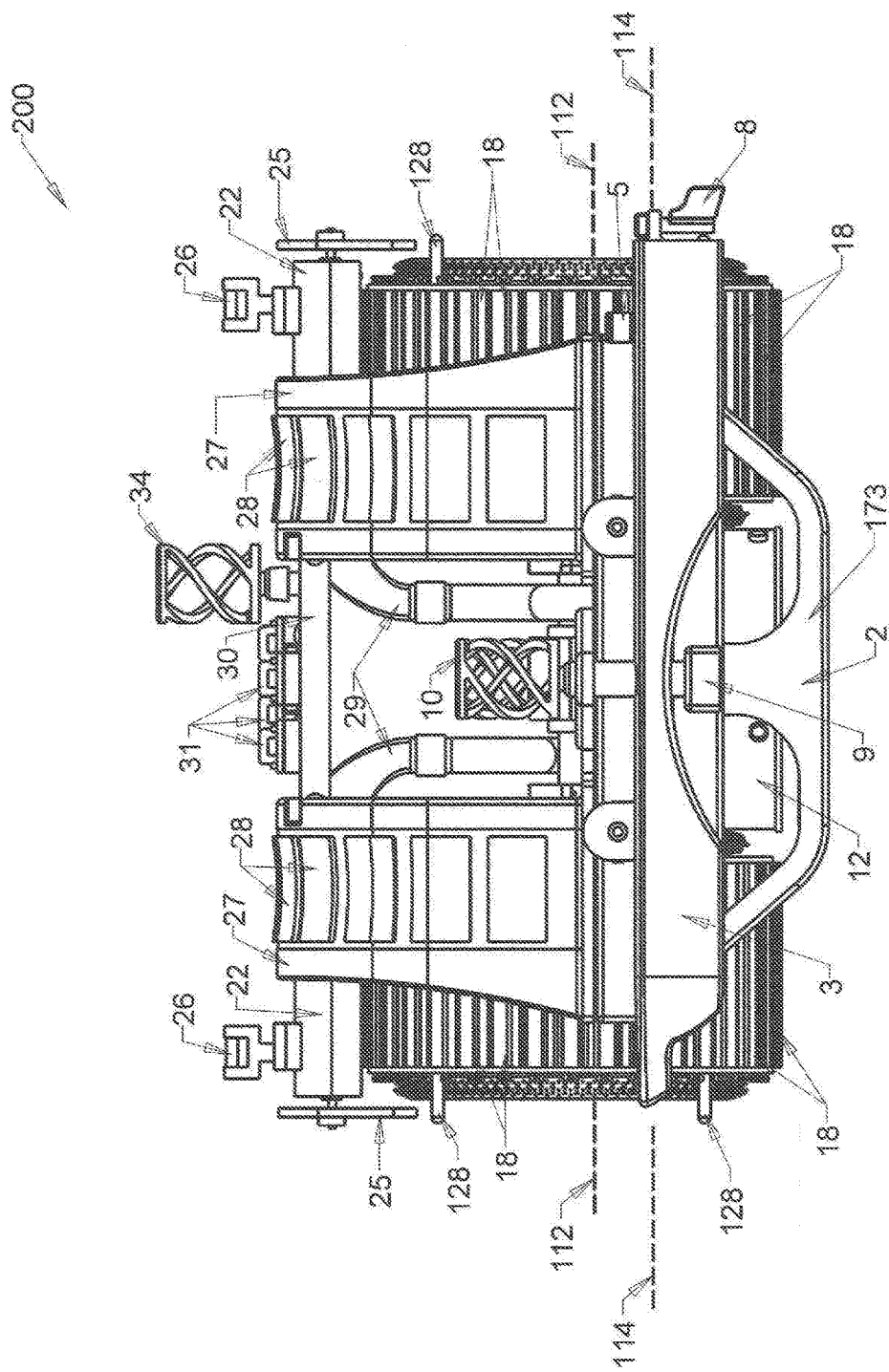
FIG. 9 is a rear elevational view of the apparatus for treating water-borne contaminants according to the present invention.
Figure 12:
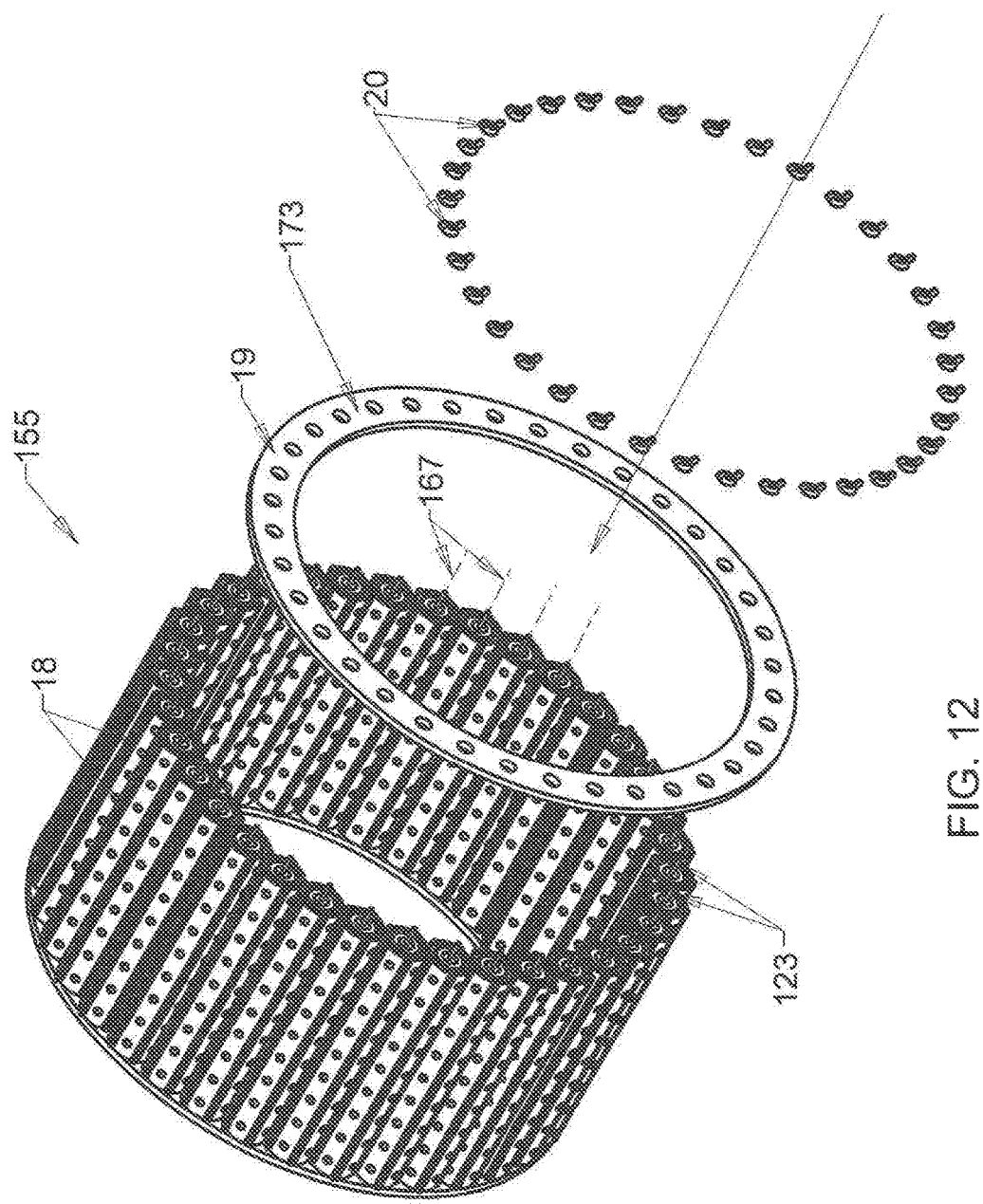
FIG. 12 is a top exploded perspective view of a cylinder assembly array according to the present invention.
Figures 14A, 14B:
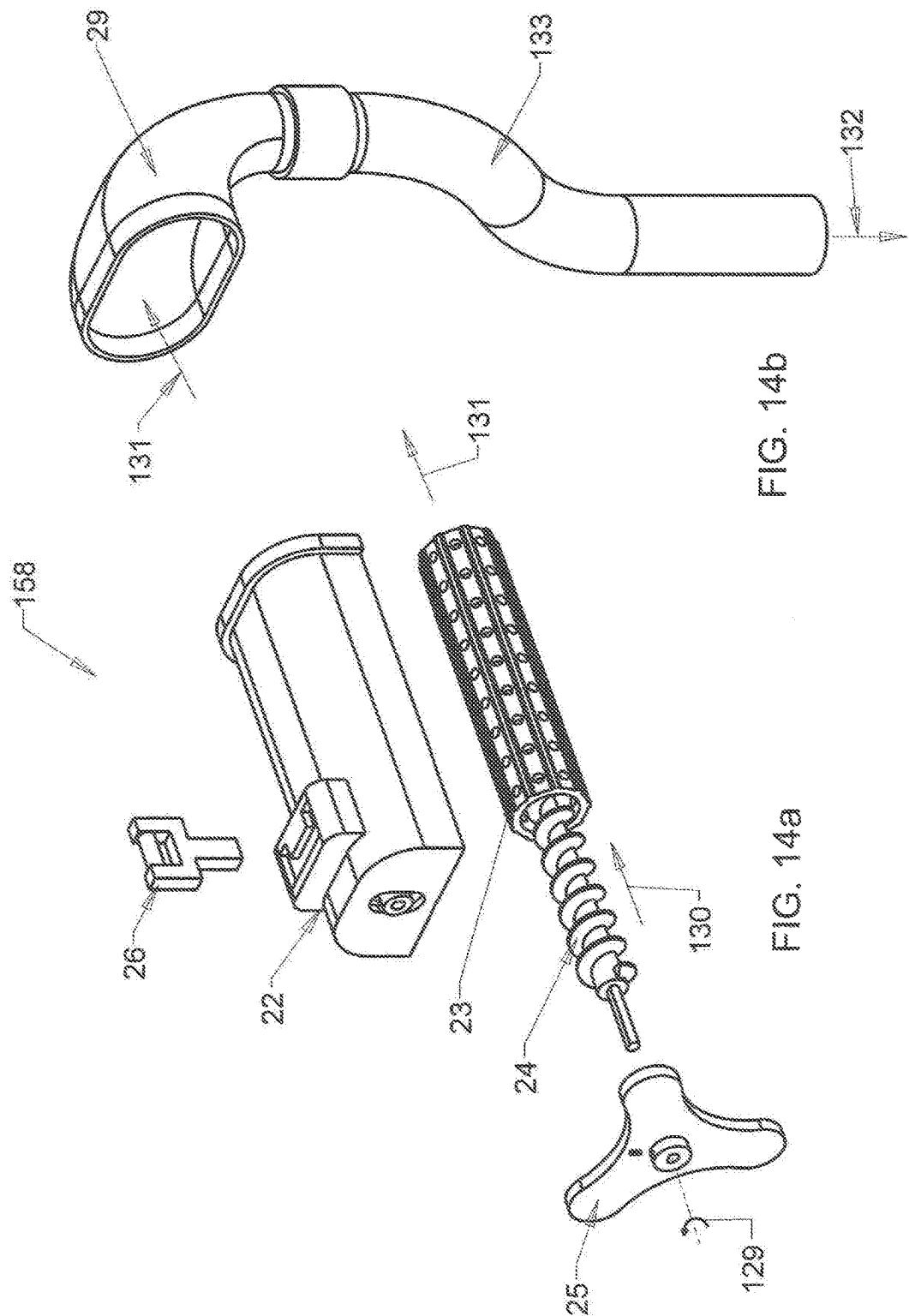
FIG. 14(a) is a top exploded perspective view of a bioactive substrate ejection assembly according to the present invention.
FIG. 14(b) is a first top perspective view of a nozzle drain tube header according to the present invention.

This hard slotted-surface roller 23 also contains an internal free-wheeling helical auger as at 24 actuated by pegs 128 mounted at regular intervals on the lower rotating cylindrical array end ring 19. Comparatively referencing FIGS. 7-9, the reader will see that the pegs 128 extend outwardly a sufficient length to occasionally contact the actuator 25 during clockwise rotation 113. Periodic peg contact with the shaft end-mounted, tri-lobe actuator(s) 25 outfitted at the end of the internal auger(s) 24 will periodically turn the auger 24 counter-clockwise (as at 129) at intervals to allow the accumulated oil waste to spiral feed (as at 130) to the nozzle drain tube header 29.

Located below the main bioplastic base support platform 1 is a centerline cross bar-supported, centerline-positioned, bellows-style polyethylene, captured bioactivated spill oil/contaminant storage tank 11. Once the oil/contaminant waste is fed (as at 131) to the nozzle drain tube header 29, the accumulated oil waste will flow (as at 132) by gravity through a quick-coupled drain hose 133 for collection and further bacterial contact time within the expandable bellows-type, polyethylene, 250 gallon capacity tank 11 mounted on center of gravity centerline below the main bioplastic platform 1.

Figure 15C:
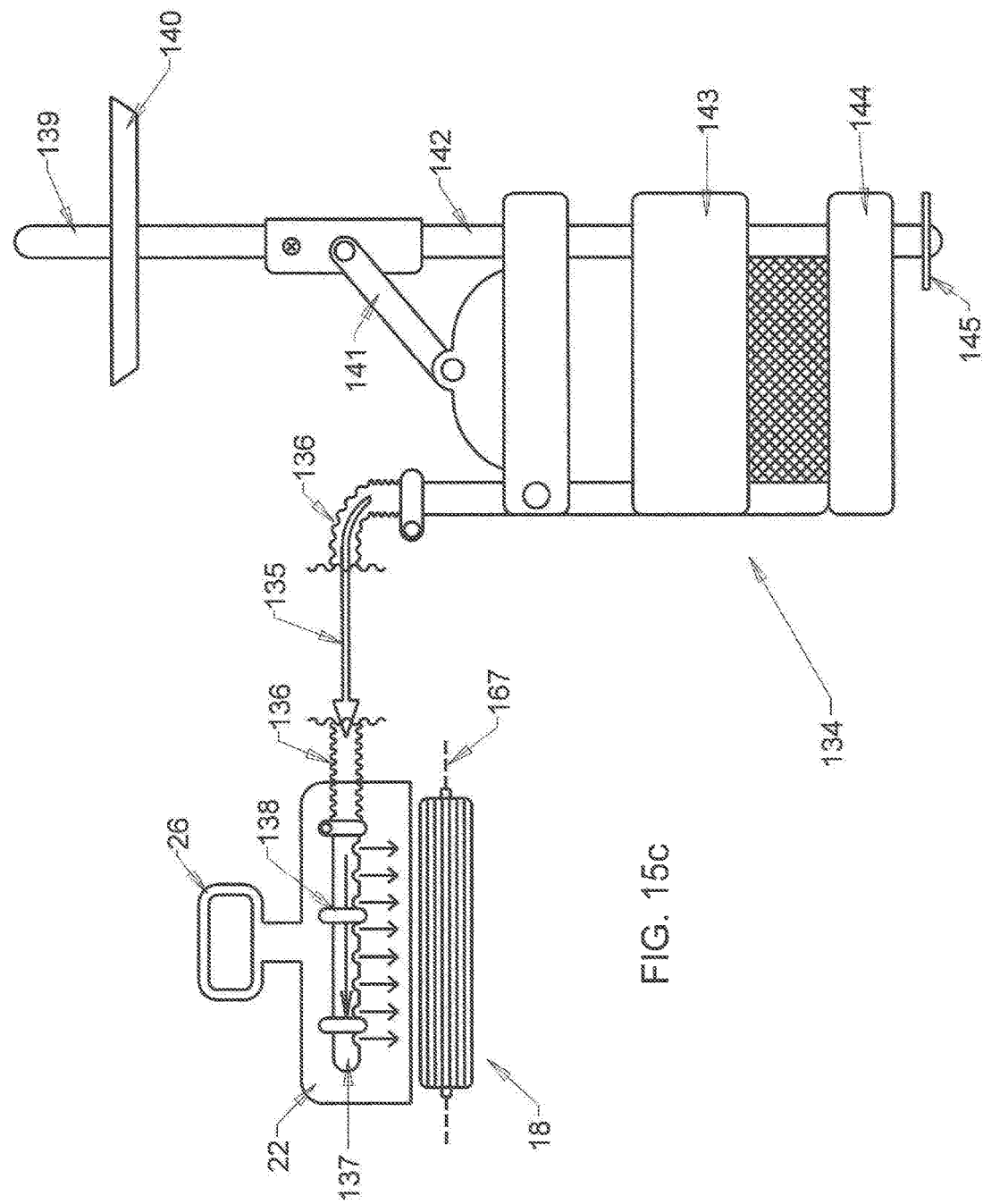
FIG. 15(c) is a diagrammatic depiction of a submersible pump assembly otherwise receivable in the tank assembly shown in FIG. 15(b) depicted as re-circulating bioactive material back to the bioactive substrate ejection assembly according to the present invention.

Installed within the holding tank 11 there is a 12 Volt, 2.5 Amp, DC volt-powered, 360 gallons per hour ring float buoyed, micro-switch-actuated, level adjustable, rod mount supported submersible style pump 134 (as exemplified by either a DC centrifugal or diaphragm recycle pump) as generally depicted in FIG. 15(c). It is contemplated that the pump 134 may preferably and essentially comprise a DC power source connection 139; a threaded tank flange 140; an adjustable set level micro-switch 141; a rod guide 142; a float ring 143; a retainer ring 144; and a safety stop washer 145.

The described submersible pump 134 fits within a dedicated female threaded coupling on the top of the storage tank 11. This incorporated pump 134, with accompanying quick coupled 0.50 inch inner diameter flex-tube fittings 136, will be used to recycle (as at 135), at predetermined tank levels, a specific volume through this tubing 136, bioactivated tank content liquor to a snap-in, clip-mounted (as at 138), 0.50 inch inner diameter perforated distribution header 137.

The distribution header 137 is positioned over the inlet side of the upper roller housing 22. This recycle methodology allows for a beneficial re-inoculation and bio-turgor enhancement while also acting on fresh incoming adsorbed oil/contaminant substrate collected on the surface of the clockwise rotating dipping/adsorption foam open-pore cylinder assemblies 18 and aeration hub assemblies 16. The apparatus 200 may thus be referred to as providing an enhanced incremental biodegradation process. This procedure mimics the best available technology engineering standard for a trickling filter and rotating biological contactor wastewater treatment regime.

Tank wings 165 of tank 11 feed through slots 166 formed in the girders 2 to prevent girders 2 from deviating from a normal vertical orientation. A pair of specialized stabilizer bioplastic veneer, buoyant foam, flow-directing floats 3 and 4 is attached by way of "slip-on" DC power transmission contact/mounting pegs 161 to the "wave suppressor" main bioplastic platform 1. Each float 3 and 4 has mounted stem servo/rudder arrangements 8 with a pair of self-contained submerged belt turbine-cup style propulsion impeller belts 7 to move the apparatus 200 to the spill or contamination site.

These specialized "flow directional" full length floats 3 and 4 work in synchrony with a pair of bioplastic main platform girders 2 which act as direction enhancing centerboards, aid in the first initial assembly step of the main platform table, adding terrain surface to the main platform clearance protection for the rotating aeration hub assemblies 16 and "outfitter stabilizer" floats 3 and 4. These bioplastic girders 2 provide clearance when the platform is floating at operating water level 114 from any underwater terrain obstructions plus act as supporting rails to slide over the shoreline into the water after land assembly.

An optional installed feature offered by the apparatus 200 is a complementary, secondary, clear polyethylene, close-fitting, slip-over-bellows design, exterior doughnut-shaped tank as depicted and referenced at 12. This tank 12 allows the owner-operator to utilize a current hydrogen generation technology fuel cell (as at 33) to complement the installed (a) water-type DC-generating devices as at 9; (b) wind-type DC-generating devices as at 10 and 34; and (c) solar-type DC-generating devices as at 28.

The DC-generating devices 9/10/34/28 supply the deep cycle, lithium storage batteries 31 which provide DC voltage on demand as a power-sourcing means to the stern-mounted, 1,750 RPM, propulsion motors 5 connected to the submerged float, cupped turbine belt propulsion drives 7; servo-actuated rudders 8; and bioplastic main platform 1 dual coupled drive ⅓ HP motor 13 responsible for rotating the hollow bioplastic drive shafts 14 connected to the tandem aeration hub assemblies 16 and locked by the hub lock finial 21.

The slip-over tank 12 is supplied with two capped tank base drains 146; 4-point electrode capped entry ports 147; one bioplastic set pressure adjustable spring overflow vent porting valve, including two capped top mounted threaded nipples for required quick coupled tubing fittings by one-way check valves for collecting/directing generated hydrogen to the fuel cell inlets provided. Hydrogen gas is a product of some types of anaerobic metabolism and is produced by several types of microorganisms, usually via reactions catalyzed by iron- or nickel-containing enzymes called hydrogenases. These enzymes catalyze the reversible redox reaction between $H_2$ and its component two protons and two electrons.

The following sampling is provided as an example. Simple water splitting in which water is decomposed into its component protons, electrons, and oxygen by applying a specific DC voltage (usually 0.5-1.5 DC volts) to selected electrode materials to liberate $H_2$ gas. These phenomena can also occur in light reactions in all photosynthetic organisms. Some such organisms, including the alga *Chalamydomonas reinhardi* and blue-green alga cyanobacteria have evolved a step in the dark reactions in which protons and electrons are reduced to form $H_2$ gas by specialized hydrogenases in their chloroplasts.

More recently, scientists from the Swiss research institute EMPA, University of Basel and the Argonne National Laboratory in Illinois discovered that by harvesting a light harvesting plant protein with their specially designed electrode, could boost the efficiency of photo-electrochemical cells used to split water and produce $H_2$ gas. These methods of generated $H_2$ gas would be collected and directed through appurtenances similar to those listed for the slip over tank 12.

Microbial Fuel Cells (MFC's) use the catalytic reaction of microorganisms to convert virtually any biodegradable, dissolved organic matter (e.g. glucose, acetate, human/agricultural/industrial wastewater) into $H_2$ fuel and simultaneously clean the waste water. Organic matter is enclosed around oxygen-free (e.g. Liquipel or Nafion hydrophobic nano-coated) anodes and organic compounds are consumed by bacteria or other microbes. As part of the digestive process, electrons are pulled from the fuel and conducted into the circuit with the help of mediator chemicals. MFC's operate in mild conditions between 68-104 degrees Fahrenheit.

Other types of fuel cells are Regenerative Fuel Cells and Zinc Air Fuel Cells. Regenerative Fuel Cells (RFC's) are a closed loop form of power generation. Water is separated into hydrogen and oxygen by a solar power electrolyzer, and then is directed to the fuel cell, where heat and water are generated. The by-product is re-circulated back to the electrolyzer where the process begins again. Zinc Air Fuel Cells (ZAFC's) combine zinc pellets with air with an electrolyte to create electricity, generating significantly more power than lead-acid batteries of the same weight.

With regard to solar cell technology, it is noted that there are many components that make up a complete solar cell system, but the four main items are: solar modules as at 28; charge controllers as diagrammatically depicted at 148; batteries 31; solar connectors 149; and inverters if AC power is required. The solar modules 28 are physically mounted on a shroud structure 27 according to the present invention, and the DC power they produce is directed (wired) through a charge controller 148 before it goes on to the battery 31 bank where it is stored. The two main functions of a charge controller 148 are to prevent the battery 31 from being overcharged and eliminate any reverse current flow from the batteries 31 back to the solar modules 28 at night.

The battery bank 31 stores the energy produced by the solar module array 28 and the wind/water generators 9/10/34 during the day for use at any time of day or night. Batteries come in many sizes and grades. Many solar electric panel systems will not produce electricity without direct or diffused sunlight. The apparatus 200 is preferably supplied with a total of 24 concave 24 inch by 24 inch flexible solar modules or cells 28 mounted on a convex shroud support 27 in order to maximize solar angle capture and also offer a panel surface self-cleaning feature. On cloudy days, the cells 28 will still be generating electricity though not as much as on sunny days. It is contemplated that the wind and water generators 9/10/34 will supply DC voltage to help compensate for overcast day solar energy power depletion.

It is noted that solar power is globally embraced and will work virtually anywhere, however some locations are better than others. Irradiance is a measure of the sun's power available at the surface of the Earth and it averages about 1000 watts per square meter. With typical crystalline solar cell efficiencies around 14-23%, these numbers mean one could expect to generate about 140-230 watts per square meter of solar cells placed in full sun.

At the time of this writing, companies like Boeing and Emcore offered a so-called, "triple junction cell" that absorbs a wider bandwidth of energy, and thus offers higher efficiency ratings. The Sharp Corporation has developed a so-called "compound solar cell" that has achieved conversion efficiency, confirmed by Japan's National Institute of Advanced Industrial Science and Technology, of 35.8%.

Insolation is a measure of the available energy from the sun and is expressed in terms of "full sun hours" (i.e. four full sun hours=4 hours of sunlight at an irradiance level of 1000 watts per square meter). Different parts of the world receive more sunlight than others, so those parts receiving more sunlight will have more "full sun hours" per day. The voltage output (Watts=Volts×Amps) from a single square 6 inch by 6 inch crystalline solar cell is about 0.5 Volts at a 7 Amp output that is directly proportional to the multi-crystalline solar cell's surface area (0.5 V×7 A=3.5 Watts possible from one 6 inch by 6 inch cell).

Typically, solar cells are wired in series in each solar module. Twenty-four 6 inch by 6 inch cells produces a solar module with a 12 V nominal output (or about 17 V at peak power) that can then be wired in series and/or parallel with other solar modules to form a complete solar array to charge a 12, 24, or 48 Volt battery bank 31. If the cells are wired in parallel, one increases the Amps. If the cells are wired in series, one increases the Volts.

The present invention incorporates a prewired architecture, base contactor "drop-in" equipment tray 30 to hold power-sourcing/controlling components. Incorporated within the bioplastic base platform 1 is a severe service, gasketed, "snap-lock capped-channel" system as generically depicted at 150 for generated DC voltage pathways 151 deliverable to the tray 30 via contact(s) (as at 153); and DC voltage load power pathways 152 deliverable from the tray 30 via contacts (as at 154) (and conductors as at 168) which would allow for the utilization of transfer options listed hereinafter:

(A) Conventional shielded cable wire to environmentally-sealed component contact connections; (B) Silver-aluminum nanocarbon covered low loss circuitry to ½ turn-to-lock sealed contact plates; (C) "Drawn" flexible, flat, mylar based, silver-ink printed sheet circuitry; (D) Carbon nanotube micro-grid technology; and (E) Siemens/Wi-Tricity Magnetic Coupled Resonance_ This latter option would offer a no-wire scenario, which would utilize a charge controller, power source resonator transmitter and power capture resonator-receiver coil for direct DC voltage power transfer.

Figure 17:
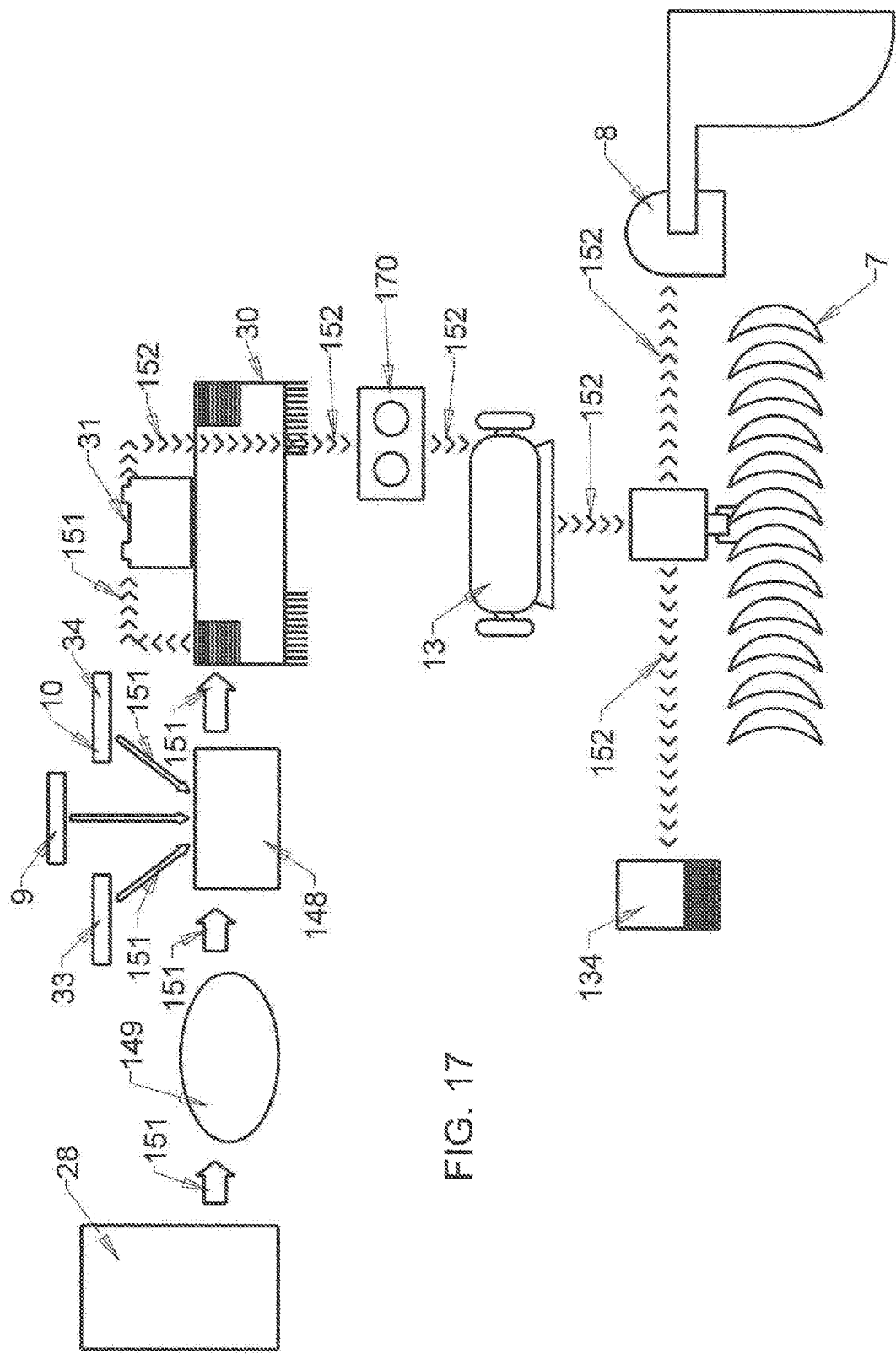
FIG. 17 is a diagrammatic depiction of the power sourcing, power delivery, and power consuming mechanisms according to the present invention.
Figure 18:
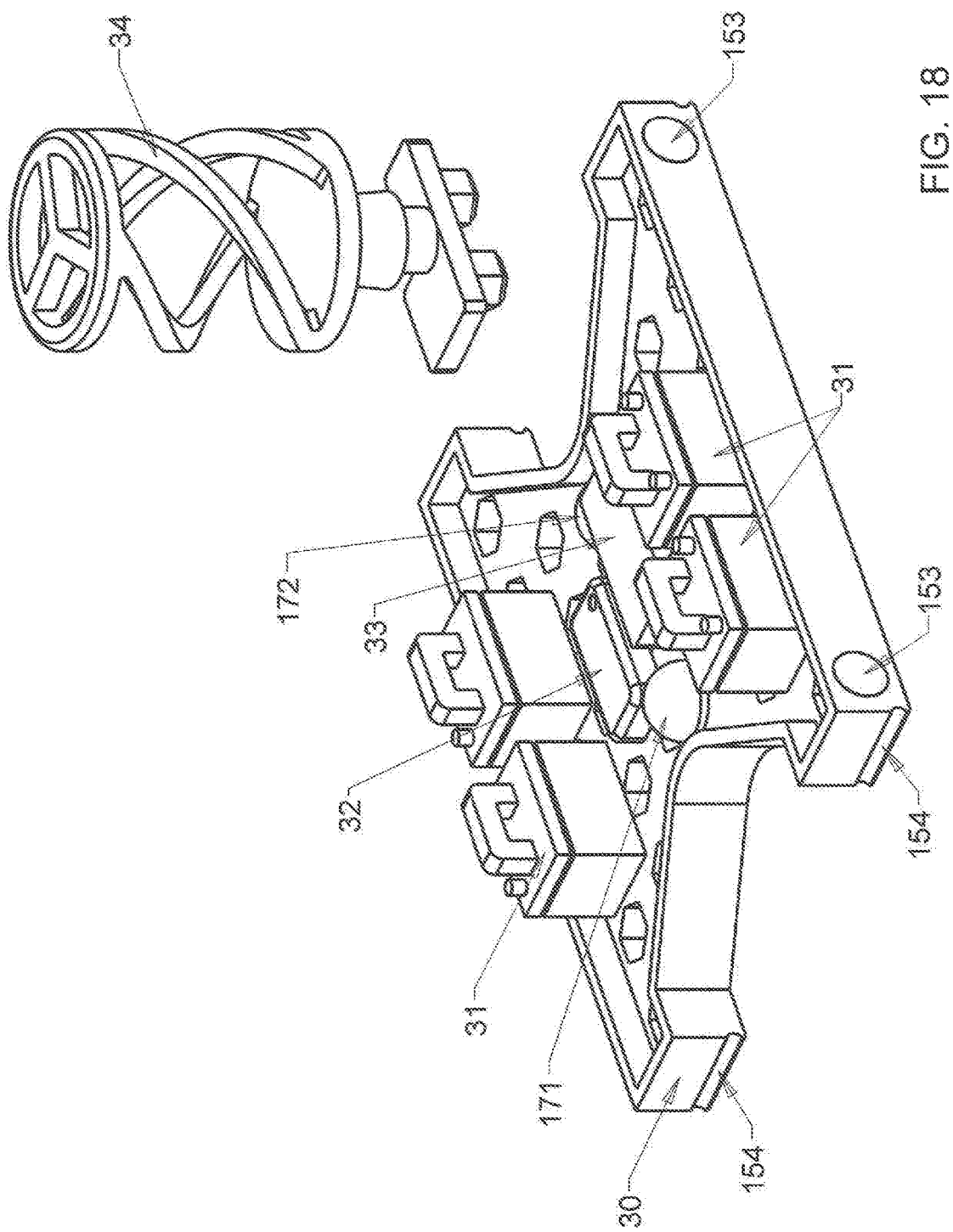
FIG. 18 is a top exploded perspective view of the drop in contact tray housing batteries, GPS module, fuel cell, and red-green battery strength/USCG marker strobe lights with wind generation unit exploded therefrom.

The present invention further contemplates the inclusion of battery tray combined battery strength/US Coast Guard-required open water red-green running light marker strobes or red-green strobe/battery strength indicators as generally depicted and referenced at 170 in FIG. 17. A red strobe is indicated at 171 in FIG. 18, and a green strobe is indicated at 172 in FIG. 18. This lighting arrangement meets a vessel/obstruction US Coast Guard (USCG) waterway mandate while also providing the potential owner/operator an important distant visual indication (an included operational preventative maintenance check list item) of the Battery Tray's Li-Ion battery charge strength.

The inherent "finish" aspect of the preferred bioplastic construction (as exemplified by Canadian Solgear Company's TRAVERSE bioplastic) renders a so-called "Rough Surface" or rough surfacing finish 173 after the injection part molding-extrusion process. This "Rough Surface" or rough surfacing finish 173 allows any commercial liquid-granular bioproduct (developed, maintained and dual-end ejected within the circular aeration drum multi-cylinder design) additional biodegrative biofilm attachment (adhesion) surface area/beneficial "surface area contact" with the drum design's intentional, rotationally generated, thin-film cascaded aeration pattern for the targeted waste water. This rough surfacing aspect of the invention enlarges and enhances the biozone "contact-mixing surface area" and further enhances the efficiency of the apparatus and system according to the present invention overall.

While the foregoing specifications set forth much specificity, the same should not be construed as setting forth limits to the invention but rather as setting forth certain preferred embodiments and features. For example, as prefaced hereinabove, it is contemplated that the present invention essentially provides a water-borne contaminant treatment apparatus and method. The water-borne contaminant treatment method may be said to comprise the steps of housing certain contaminant-metabolizing microorganisms as at 102 within or via certain microorganism housing means as exemplified by the individual roller cylinder assemblies 18 and the more systemic cylinder assembly array 155 comprising a series of side by side arranged and concentric roller cylinder assemblies 18.

The water-borne contaminant treatment method further preferably comprises the step of positioning the microorganism housing means as variously exemplified in (superior) adjacency to water-borne contaminants. In this regard, it will be recalled that at least one roller cylinder assembly 18 of the array 155 will be positioned in superior adjacency to the surface 114 as perhaps best seen in FIGS. 4-6, and 9, whereafter the microorganism housing means are periodically dipped into the water-borne contaminants or a contaminant environment.

In this regard, the preferred methodology specifies that the step of positioning the microorganism housing means in (superior) adjacency to surface 114 involves the step of positioning an axis of rotation 112 in parallel adjacency to the water-borne contaminant as exemplified by surface 114. The step of periodically dipping the microorganism housing means into the water-borne contaminant is thus preferably operable by cyclic rotation about the axis of rotation 112.

The foregoing descriptions specify a preferred counter-clockwise rotation about axis of rotation 112 (in view of the handedness of auger 24). Notably if the worm gear like aspect or handedness of the auger 24 were reversed, a counter clockwise rotation about axis of rotation 112 would provide substantially equivalent results by periodically engaging the actuator 25 with pegs 128 from the reverse direction.

The water-borne treatment method involves a periodic or dipping process, and this regard certain microorganism housing means may take the form of any number of vessels so long as the periodic or dipping action wets the bioaugmentation material in an environment conducive to metabolic process. Necessarily the process must involve an oxygenated environment. It is believed that the step of housing the contaminant-metabolizing microorganisms in a cylinder assembly array 155 rotatable about the axis of rotation 112, and having a radius of rotation 156 extending into the water-borne contaminant surface (as at 114) such that individual roller cylinder assemblies 18 are periodically dipped into the water-borne contaminant yields an environment more conducive to vigorous metabolism for reasons earlier stated.

The microorganisms or bioaugmentation product is thus exposed to both the water-borne contaminants and an oxygenated environment via the periodic or dipping action, whereby the microorganism or bioaugmentation product may more readily metabolize the contaminants in the presence of oxygen into innocuous matter or by-products 103 such as $CO_2$ (106); $H_2$ (107); energy 108; and stabilized, innocuous, solid organic residues (109).

When housing the microorganisms or bioaugmentation product within the exemplified housing means, the water-borne treatment method may be said to preferably comprise the further steps of housing the microorganisms within a radially inner cylindrical construction (as at 122) a roller cylinder assembly as at 18; and adsorbing a contaminant-laden environment such as thin film upon a radially outer cylindrical construction as at casing 121 of the roller cylinder assembly 18, thereby enveloping the inner cylindrical construction 122 with an adsorbed outer layer of contaminant substrate for enhancing metabolic activity of the microorganisms 102. It will be recalled that the treatment method may further preferably comprise the step of incubating the inner cylindrical construction 122 via the outer cylindrical construction 121 for further enhancing metabolic activity of the microorganisms 102.

Further, and particularly important to the practice of the contaminant treatment method according to the present invention, is the process of aerating and/or oxygenating the contaminant environment so as to replenish oxygen levels otherwise depleted by the metabolic activity of the microorganisms. In this regard, the contaminant treatment method may be said to further preferably comprise the step of simultaneously aerating the water-borne contaminant with a basket weave construction as at 116 while periodically dipping the microorganism housing means for enhancing contaminant metabolism of the microorganisms 102.

Recall that the preferred basket constructions are concave relative to the ends of the apparatus 200, and given the concavity of the constructions, the treatment method may be said to further comprise the step of vortexing the water-borne contaminant toward the housing means for further enhancing the metabolic activity of the microorganisms. In other words, the structure of the primary aerating mechanism further operates to cycle and localize the bioactive liquid mixture for enhancing the metabolic process.

As may be gleaned from the foregoing discussions, any added structural feature and associated method aimed at enhancing the metabolic process is believed highly beneficial to the operation of the apparatus 200. Accordingly, the contaminant treatment method may further preferably comprise the step of directing bioactive liquid material through certain surface area enhancement means as exemplified by the bristled ring band array 157 situated intermediate the basket construction 116 or aeration hub assembly 16 and the cylinder assembly array 155 for localizing and enhancing metabolic activity of the microorganisms 102.

The contaminant treatment method may further preferably comprise the step of ejecting bioactive liquid from the cylinder assembly array 155 via certain liquid ejection means as exemplified by components 22, 23, 24, 25, and 26, which collectively may be said to comprise a bioactive substrate ejection assembly 158, which assembly is made cooperable with the dipping or periodic means earlier specified and exemplified.

The dipping or periodic means operate to periodically actuate the liquid ejection means as exemplified by the bioactive substrate ejection assembly 158 for periodically driving (as at 130) ejected bioactive matter toward a (contained) microorganism metabolic activity site as exemplified by tank 11, whereafter certain contained bioactive matter may be recycled back (as at 135) to the surface site via the pumping action of pump 134 and release action via assembly 158 for further aeration and/or mixing.

The apparatus 200 according to the present invention is thus essentially designed to treat water-borne contaminants or alternatively to stimulate the bioactivity of certain bioaugmentation products. The apparatus 200 according to the present invention is believed to essentially comprise certain housing means for housing contaminant-metabolizing microorganisms or bioaugmentation product(s). The housing means are exemplified by the roller cylinder assembly as a single unit or by the cylinder assembly array as a systemic assemblage of individual housing units.

The apparatus 200 further preferably comprises certain positioning means for floatably positioning the housing means in superior adjacency to a water-borne contaminant. The positioning means are exemplified by the floats 3 and 4 operably connected to the platform 1 via girders 2. The girders 2 have (hexagonal) pins 163 that may cooperate with (hexagonal) female structures 164 formed in the platform 1. Further, male pins 161 formed on the girders 2 are received in pillow block type encased female structures 162 formed on the floats 3 and 4. Locking pins 6 may function to hold the pins 161 within the structures 162. Shafts 14 are mounted to the platform via the motor 13 and pillow block bearings 115 for positioning the axis of rotation in parallel superior adjacency to the surface 114 or water-borne contaminant.

The dipping or periodic means according to the present invention are believed essential and function to periodically dip the housing means into the water-borne contaminant or otherwise contact the housing means with the contaminant. The dipping means are exemplified by a number of sub-assemblies or systems including the cylinder assembly arrays 155, the aeration hub assemblies 16, the shafts 14 about which the arrays 155 and assemblies 16 rotate, the motor 13 that drives the rotation at 113, and the various power sourcing means as previously specified and exemplified. Together, the noted assemblies operate to effect a dipping action, and thus may be said to exemplify certain dipping means according to the present invention.

By way of the dipping action, the microorganisms are thereby being exposed to the water-borne contaminants and oxygen, in which environment the microorganisms may readily metabolize the water-borne contaminant.

The apparatus 200, as earlier specified, preferably comprises at least one roller cylinder assembly, each of which further preferably comprises a radially inner cylindrical construction as at tube 122, which inner cylinder construction has a micro-cylindrical axis 167 parallel to the axis of rotation 112 at the radius of rotation 157. The roller cylinder assembly 18 according to the present invention further preferably comprises a radially outer cylindrical construction as at casing 121.

While the radially inner cylindrical construction essentially functions to house the microorganisms, the outer cylindrical construction essentially functions to adsorb water-borne contaminants and incubate the radially inner cylindrical construction. The porous, foam-based, outer cylindrical construction or casing 121 thus contributes to or otherwise enhances the metabolic activity of the microorganisms for reasons earlier specified.

The apparatus 200 has been specified as preferably comprising two (i.e. bow and stern based) cylinder assembly arrays 155 and aeration hub assemblies 16. It is believed that the essence of the invention is well-practiced or demonstrated by a single aeration hub assembly 16 and/or cylinder assembly array 15 according to the specifications set forth hereinabove.

Accordingly, the invention is believed to essentially comprise at least one, but preferably two cylinder assembly arrays 155. A first cylinder assembly array 155 comprises a plurality of cylinder assemblies substantially identical to the roller cylinder assembly arranged in a cylindrical manner such that the micro-cylindrical axes 167 define a cylindrical structure having a macro-cylindrical axis and a macro-cylindrical radius, the macro-cylindrical axis being coaxial with the axis of rotation 112, the macro-cylindrical radius being coextensive with the radius of rotation 157.

The aeration means as exemplified by the aeration hub assembly and its various add-on features are, cooperable with the dipping means as earlier specified and exemplified for aerating and oxygenating the water-borne contaminants for enhancing contaminant metabolism by the microorganisms. The aeration means, for example, may be preferably exemplified or defined by a basket construction 116 radially inward relative to the cylinder assembly array 155. The basket construction 116 simultaneously aerates the water-borne contaminants while the dipping means dip the microorganism housing means into the water-borne contaminants.

The apparatus 200 may further preferably comprise certain surface area enhancement means intermediate the aeration means or basket construction 116 and the cylinder assembly array 155. The aeration means or basket construction may preferably comprise radially outer liquid-letting apertures as at slots 118. The surface area enhancement means, as exemplified by bristled, elastomeric ring bands essentially function to provide greatly enhanced surface area attachment structure for returning a thin film type draining bioactive liquid or matter to the basket construction 16 from the cylinder assembly array 155 via the liquid-letting apertures 118. The surface area enhancement means thus localize and enhance metabolic activity of the microorganisms.

Preferably located at each end of the apparatus 200, is the basket construction preferably having a concave construction relative to the outer end(s) for vortexing 127 the water-borne contaminants 101 toward the housing means for enhancing metabolic activity of the microorganisms. Certain bioproduct ejection means, as exemplified by the assembly 158, selectively and adjustably ejecting bioproduct from each roller cylinder assembly 18 of the cylinder assembly array 155. The bioproduct ejection means are cooperable with the dipping means for periodically actuating the bioproduct ejection means and periodically driving ejected bioproduct toward a microorganism metabolic activity site.

Accordingly, although the invention has been described by reference to certain preferred embodiments and certain methodologies, it is not intended that the novel arrangement and methods be limited thereby, but that modifications thereof are intended to be included as falling within the broad scope and spirit of the foregoing disclosures and the appended drawings.

I claim:

1. A water-borne contaminant treatment method, the treatment method comprising the steps of:
    housing contaminant-metabolizing microorganisms within a radially inner cylindrical construction of a roller cylinder assembly;
    positioning the roller cylinder assembly in superior adjacency to a water-borne contaminant;
    periodically dipping the roller cylinder assembly into the water-borne contaminant;
    adsorbing a contaminant-laden environment upon a radially outer cylindrical construction of the roller cylinder assembly, thereby enveloping the inner cylindrical construction with an adsorbed outer layer of contaminant substrate;
    exposing the microorganisms to the water-borne contaminant and oxygen via periodic dipping action;
    metabolizing the contaminant via the microorganisms in the presence of oxygen into innocuous matter;
    positioning an axis of rotation in parallel adjacency to the water-borne contaminant, the step of periodically dipping the roller cylinder assembly into the water-borne contaminant being operable by cyclic rotation about the axis of rotation; and
    the roller cylinder assembly array being rotatable about the axis of rotation and having a radius of rotation extending into the water-borne contaminant, the roller cylinder assembly array being rotatable such that individual cylinder assemblies are periodically dipped into the water-borne contaminant; and
    rotating the individual cylinder assemblies thereby mixing the contents contained therein, the individual cylinder assemblies alternately rotating clockwise and counterclockwise.

2. The treatment method of claim 1 comprising the step of incubating the microorganisms within the inner cylindrical construction on a surface of the outer cylindrical construction to enhance the metabolic activity of the microorganisms.

3. The treatment method of claim 1 comprising the step of simultaneously aerating the water-borne contaminant with a basket construction while periodically dipping the roller cylinder assembly for enhancing contaminant metabolism by the microorganisms.

4. The treatment method of claim 3 comprising the step of vortexing the water-borne contaminant with said basket construction, said basket construction being concave for enhancing metabolic activity of the microorganisms.

5. The treatment method of claim 3 comprising the step of directing bioactive material through surface area enhancement means situated intermediate the basket construction and the roller cylinder assembly array for localizing and enhancing metabolic activity of the microorganisms.

6. The treatment method of claim 1 comprising the step of ejecting bioactive material from the roller cylinder assembly via a hard roller cooperable with a shaft and motor assembly, said a shaft and motor assembly for periodically actuating hard roller periodically driving ejected bioactive material toward a microorganism metabolic activity site.

7. A water-borne contaminant treatment method, the treatment method comprising the steps of:
   housing contaminant-metabolizing microorganisms in housing means;
   positioning the housing means in superior adjacency to a water-borne contaminant;
   simultaneously aerating the water-borne contaminant with a basket construction while periodically dipping the housing means into the water-borne contaminant;
   exposing the microorganisms to the water-borne contaminant and oxygen via periodic dipping action;
   metabolizing the contaminant via the microorganisms in the presence of oxygen into innocuous matter;
   ejecting bioactive material from the roller cylinder assembly via a hard roller:
   drawing air into the roller cylinder assembly after ejection, oxygenating the roller cylinder assembly; and
   compressing the roller cylinder assembly thereby dissolving the oxygen.

8. The treatment method of claim 7 comprising the step of simultaneously aerating the water-borne contaminant with the basket construction while periodically dipping the housing means for enhancing contaminant metabolism by the microorganisms.

9. The treatment method of claim 8 comprising the step of vortexing the water-borne contaminant via the basket construction, the basket construction being concave and having a diamond weave for enhancing metabolic activity of the microorganisms.

10. A water-borne contaminant treatment method, the treatment method comprising the steps of:
   housing contaminant-metabolizing microorganisms within a radially inner cylindrical construction of a roller cylinder assembly;
   positioning the roller cylinder assembly in superior adjacency to a water-borne contaminant;
   periodically dipping the roller cylinder assembly into the water-borne contaminant;
   adsorbing a contaminant-laden environment upon a radially outer cylindrical construction of the roller cylinder assembly, thereby enveloping the inner cylindrical construction with an adsorbed outer layer of contaminant substrate;
   exposing the microorganisms to the water-borne contaminant and oxygen via periodic dipping action;
   metabolizing the contaminant via the microorganisms in the presence of oxygen into innocuous matter;
   simultaneously aerating the water-borne contaminant with a basket construction while periodically dipping the roller cylinder assembly for enhancing contaminant metabolism by the microorganisms; and
   vortexing the water-borne contaminant with said basket construction, said basket construction being concave for enhancing metabolic activity of the microorganisms.

11. A water-borne contaminant treatment method, the treatment method comprising the steps of:
   housing contaminant-metabolizing microorganisms within a radially inner cylindrical construction of a roller cylinder assembly;
   positioning the roller cylinder assembly in superior adjacency to a water-borne contaminant;
   periodically dipping the roller cylinder assembly into the water-borne contaminant;
   adsorbing a contaminant-laden environment upon a radially outer cylindrical construction of the roller cylinder assembly, thereby enveloping the inner cylindrical construction with an adsorbed outer layer of contaminant substrate;
   exposing the microorganisms to the water-borne contaminant and oxygen via periodic dipping action;
   metabolizing the contaminant via the microorganisms in the presence of oxygen into innocuous matter; and
   ejecting bioactive material from the roller cylinder assembly via a hard roller cooperable with a shaft and motor assembly, said a shaft and motor assembly for periodically actuating hard roller periodically driving ejected bioactive material toward a microorganism metabolic activity site.

12. A water-borne contaminant treatment method, the treatment method comprising the steps of:
   housing contaminant-metabolizing microorganisms in housing means;
   positioning the housing means in superior adjacency to a water-borne contaminant;
   simultaneously aerating the water-borne contaminant with a basket construction while periodically dipping the housing means into the water-borne contaminant;
   exposing the microorganisms to the water-borne contaminant and oxygen via periodic dipping action;
   metabolizing the contaminant via the microorganisms in the presence of oxygen into innocuous matter;
   simultaneously aerating the water-borne contaminant with the basket construction while periodically dipping the housing means for enhancing contaminant metabolism by the microorganisms; and
   vortexing the water-borne contaminant via the basket construction, the basket construction being concave and having a diamond weave for enhancing metabolic activity of the microorganisms.

* * * * *